(12) United States Patent
Steenblock et al.

(10) Patent No.: US 12,459,714 B2
(45) Date of Patent: Nov. 4, 2025

(54) MULTI-FILM THERMOPLASTIC BAGS WITH ZONES OF CONTACT AREAS HAVING VARIABLE LAMINATION

(71) Applicant: THE GLAD PRODUCTS COMPANY, Oakland, CA (US)

(72) Inventors: Sarah J. Steenblock, Cincinnati, OH (US); Matthew W. Waldron, West Chester, OH (US); Edward B. Tucker, Yorkville, IL (US); Shaun T. Broering, Fort Thomas, KY (US); Deborah K. Fix, Maineville, OH (US); David A. Bailey, Cincinnati, OH (US)

(73) Assignee: THE GLAD PRODUCTS COMPANY, Oakland, CA (US)

( * ) Notice: Subject to any disclaimer, the term of this patent is extended or adjusted under 35 U.S.C. 154(b) by 80 days.

(21) Appl. No.: 18/425,798

(22) Filed: Jan. 29, 2024

(65) Prior Publication Data
US 2024/0166415 A1    May 23, 2024

Related U.S. Application Data

(63) Continuation-in-part of application No. 17/167,390, filed on Feb. 4, 2021, now Pat. No. 11,970,310, which
(Continued)

(51) Int. Cl.
*B65D 65/40* (2006.01)
*B32B 3/30* (2006.01)
(Continued)

(52) U.S. Cl.
CPC ............... *B65D 65/40* (2013.01); *B32B 3/30* (2013.01); *B32B 7/022* (2019.01); *B32B 27/08* (2013.01);
(Continued)

(58) Field of Classification Search
CPC ............ B65D 65/40; B32B 7/022; B32B 3/30
See application file for complete search history.

(56) References Cited

U.S. PATENT DOCUMENTS

| 3,029,853 A | 4/1962 | Piazze |
| 3,114,497 A | 12/1963 | Kugler |

(Continued)

FOREIGN PATENT DOCUMENTS

| CN | 103648750 A | 3/2014 |
| CN | 204222116 U | 3/2015 |

(Continued)

OTHER PUBLICATIONS

U.S. Appl. No. 17/441,118, Apr. 18, 2024, Notice of Allowance.
(Continued)

*Primary Examiner* — Derek J Battisti
(74) *Attorney, Agent, or Firm* — Keller Preece PLLC

(57) ABSTRACT

One or more implementations of a multi-film thermoplastic bag including a zone of contact areas between adjacent films with varying lamination. The contact areas comprise areas in which at least first and second thermoplastic films of the multi-film thermoplastic bag are in intimate contact and bonded together by heat and pressure. The contact areas help reinforce the bag due to increased stiffness provided by the contact areas, as well as distribute stresses/strain over more material, and thereby, help reduce tearing or other damage by stresses/strain from grasping fingers (e.g., during a grabbing motion to lift or carry) or objects being placed inside the bag. Additionally, the increased stiffness can provide a tactile feel that connotes strength to a user grasping the grab zone.

19 Claims, 13 Drawing Sheets

Related U.S. Application Data is a continuation-in-part of application No. PCT/US2020/024143, filed on Mar. 23, 2020.

(60) Provisional application No. 62/825,520, filed on Mar. 28, 2019.

(51) Int. Cl.
  *B32B 7/022* (2019.01)
  *B32B 27/08* (2006.01)
  *B65D 33/02* (2006.01)
  *B65D 33/28* (2006.01)
  *B65F 1/00* (2006.01)

(52) U.S. Cl.
  CPC ............ *B65D 33/02* (2013.01); *B65D 33/28* (2013.01); *B65F 1/002* (2013.01); *B32B 2439/06* (2013.01)

(56) References Cited

U.S. PATENT DOCUMENTS

| | | | |
|---|---|---|---|
| 3,512,456 A | 5/1970 | Meyer | |
| 3,543,999 A | 12/1970 | Kugler | |
| 3,738,568 A | 6/1973 | Ruda | |
| 3,772,968 A | 11/1973 | Ruda | |
| 4,493,683 A | 1/1985 | Jostler | |
| 4,558,463 A | 12/1985 | Boyd | |
| 4,878,764 A | 11/1989 | Meyer | |
| 4,883,675 A | 11/1989 | Wemz | |
| 5,554,093 A | 9/1996 | Porchia et al. | |
| 5,716,137 A | 2/1998 | Meyer | |
| 5,928,972 A | 7/1999 | Mashiko et al. | |
| 6,561,696 B1 | 5/2003 | Rusnak et al. | |
| 7,938,635 B2 | 5/2011 | Heilman et al. | |
| 8,876,382 B2 | 11/2014 | Wilcoxen et al. | |
| 9,393,757 B2 | 7/2016 | Borchardt et al. | |
| 9,604,429 B2 | 3/2017 | Borchardt et al. | |
| 9,745,126 B1* | 8/2017 | Cobler ................ B65F 1/0026 |
| 10,549,467 B2 | 2/2020 | Borchardt et al. | |
| 10,934,058 B2 | 3/2021 | Cobler | |
| 11,345,118 B2* | 5/2022 | Wilcoxen ............ B29C 66/1122 |
| 2004/0137200 A1 | 7/2004 | Chhabra et al. | |
| 2005/0123219 A1 | 6/2005 | Schneider | |
| 2007/0036472 A1 | 2/2007 | Persenda | |
| 2007/0257402 A1 | 11/2007 | Rasmussen | |
| 2009/0094943 A1 | 4/2009 | Heilman et al. | |
| 2010/0111452 A1 | 5/2010 | Ross | |
| 2010/0266222 A1 | 10/2010 | Rusnak et al. | |
| 2011/0052105 A1 | 3/2011 | Wilcoxen et al. | |
| 2012/0045153 A1 | 2/2012 | Schmal et al. | |
| 2012/0134606 A1* | 5/2012 | Borchardt ............ B65D 33/28 156/196 |
| 2012/0269465 A1 | 10/2012 | Dorsey et al. | |
| 2015/0071574 A1* | 3/2015 | Fraser ................ B29C 66/8511 383/109 |
| 2015/0104121 A1 | 4/2015 | Broering et al. | |
| 2015/0191599 A1 | 7/2015 | Cobler | |
| 2017/0305104 A1* | 10/2017 | Wilcoxen ................ B32B 3/30 |
| 2018/0282025 A1 | 10/2018 | Odenthal | |
| 2022/0144516 A1 | 5/2022 | Waldron et al. | |
| 2022/0161979 A1* | 5/2022 | Steenblock ............. B32B 27/36 |
| 2022/0219864 A1* | 7/2022 | Steenblock ............. B65D 31/02 |

FOREIGN PATENT DOCUMENTS

| | | |
|---|---|---|
| CN | 104918767 A | 9/2015 |
| CN | 207312156 U | 5/2018 |
| DE | 8634032 U1 | 3/1987 |
| DE | 4133095 A1 | 10/1992 |
| DE | 202008013591 U1 | 2/2010 |
| DE | 102016116639 A1 | 3/2017 |
| EP | 266670 B1 | 3/1992 |
| EP | 953511 B1 | 3/2003 |
| EP | 1364892 B1 | 12/2005 |
| ES | 1061986 U | 5/2006 |
| FR | 2858807 A1 | 10/2005 |
| GB | 2009098 B | 2/1982 |
| JP | 2002179089 A | 6/2002 |
| JP | 4140337 B2 | 6/2008 |
| WO | 88/04635 A1 | 6/1988 |
| WO | 2001/51372 A1 | 7/2001 |
| WO | 2005/016791 A1 | 2/2005 |
| WO | 2006/097104 A2 | 9/2006 |
| WO | 2016/040765 A1 | 3/2016 |
| WO | 2016/073722 A1 | 5/2016 |

OTHER PUBLICATIONS

U.S. Appl. No. 18/330,138, Jun. 20, 2024, Office Action.
Office Action as received in CN application 202080025253.8 dated Oct. 12, 2023.
PCT Application No. PCT/US2020/024143 International Search Report and Written Opinion dated Jul. 28, 2020.
U.S. Appl. No. 17/167,390, Jul. 26, 2022, Office Action.
U.S. Appl. No. 17/167,390, Jan. 13, 2023, Office Action.
U.S. Appl. No. 17/167,390, May 3, 2023, Office Action.
U.S. Appl. No. 17/167,390, Sep. 6, 2023, Office Action.
U.S. Appl. No. 17/167,390, Dec. 20, 2023, Notice of Allowance.
U.S. Appl. No. 17/585,211, May 19, 2023, Office Action.
U.S. Appl. No. 17/585,211, Jul. 28, 2023, Notice of Allowance.
U.S. Appl. No. 17/441,118, Jan. 12, 2024, Office Action.
Examination Report as received in Australian Application No. 2020245443 dated Apr. 2, 2025.
Examination Report as received in Canadian Application No. 3134701 dated Jan. 29, 2025.
U.S. Appl. No. 18/330,138, Sep. 5, 2024, Notice of Allowance.
U.S. Appl. No. 18/484,985, Jul. 25, 2025, Office Action.

\* cited by examiner

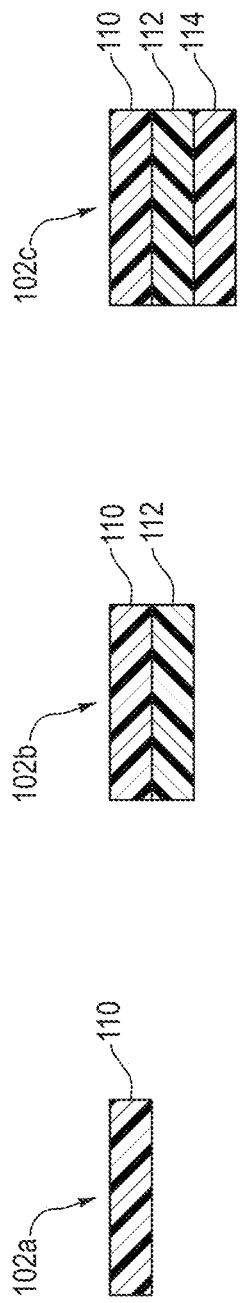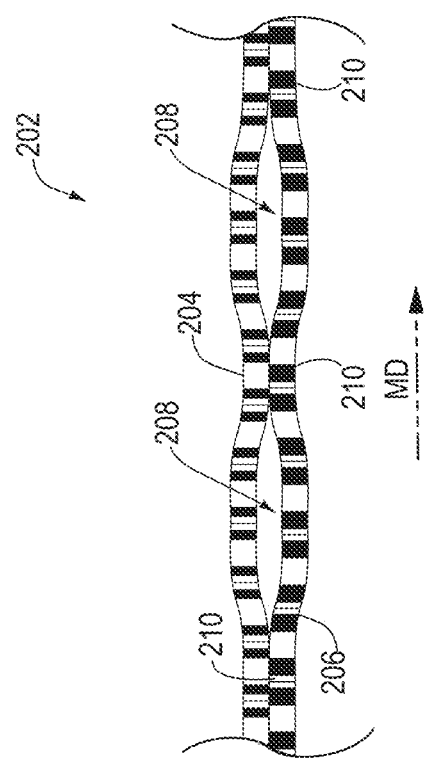

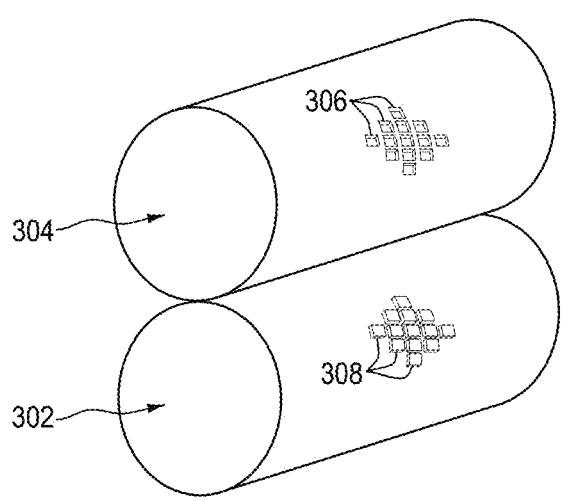
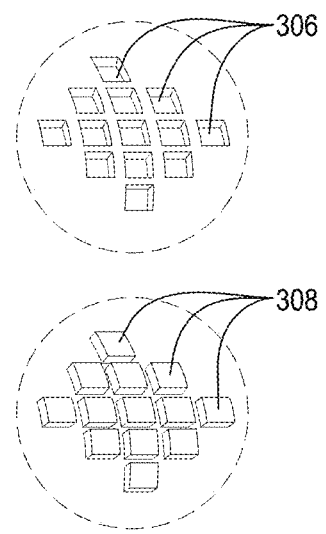
*Fig. 3A*  *Fig. 3B*
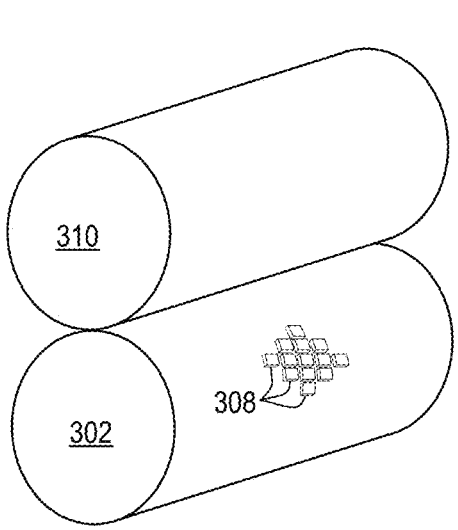
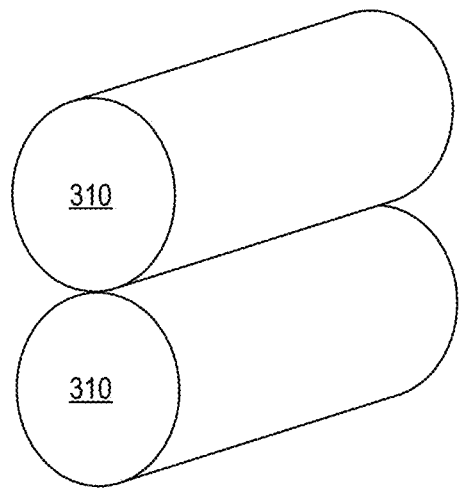
*Fig. 3C*  *Fig. 3D*

MULTI-FILM THERMOPLASTIC BAGS WITH ZONES OF CONTACT AREAS HAVING VARIABLE LAMINATION

CROSS-REFERENCE TO RELATED APPLICATIONS

The present application is a continuation-in-part U.S. patent application Ser. No. 17/167,390, filed on Feb. 4, 2021 and entitled: MULTI-FILM THERMOPLASTIC BAGS HAVING GRAB ZONES WITH CONTACT AREAS AND METHODS OF MAKING THE SAME, which is a continuation-in-part of International Application No. PCT/US2020/24143, filed on Mar. 23, 2020 and entitled: MULTI-FILM THERMOPLASTIC STRUCTURES AND BAGS HAVING VISUALLY-DISTINCT CONTACT AREAS AND METHODS OF MAKING THE SAME, which claims the benefit of and priority to U.S. Provisional Application No. 62/825,520, filed Mar. 28, 2019 and entitled: MULTI-FILM THERMOPLASTIC STRUCTURES AND BAGS HAVING VISUALLY-DISTINCT CONTACT AREAS AND METHODS OF MAKING THE SAME. The contents of the above-referenced patent applications are hereby incorporated by reference in their entirety.

BACKGROUND

1. Technical Field

The present application relates generally to thermoplastic bags. More particularly, the present application relates to thermoplastic bags including multiple films and unique aesthetics.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One way manufacturers may attempt to reduce production costs is to stretch the thermoplastic film, thereby increasing its surface area and reducing the amount of thermoplastic film needed to produce a product of a given size.

While stretched, thinner gauge materials can represent cost savings to the manufacturer, the use of thinner gauge films can result in lower durability. Although some recent technology may, in some cases at least, result in relatively thinner gauge films that may be as strong as their thicker counterparts, customers naturally sense from prior experience that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. This is particularly true when thin looking or feeling films are used in areas of customer products with which the customer comes in direct contact—such as the open end of a trash bag where a customer would gather the bag in order to remove the bag from a trash can.

Thus, even though some mechanisms can improve some aspects of film strength while using a thinner gauge, the look and feel of such films tend to cause customers to believe the film is nevertheless low quality. For example, thinner thermoplastic films are typically more transparent or translucent. Such consumers may feel that they are receiving less value for their money when purchasing products with thinner films; and thus, may be dissuaded to purchase thinner thermoplastic films.

Additionally, as a result of thinner bags, some conventional thermoplastic trash bags are prone to tearing, ruptures, and other issues at the top of the bag. For example, when grasping a conventional thermoplastic liner by a top portion, a grasping hand (e.g., fingers) can puncture or overly stretch (leading to subsequent failure of) the trash bag. For instance, after fingers stretch a thermoplastic bag during a grasping motion, these overly stretched areas are further compromised (e.g., in some cases to the point of failure) when pulling or lifting a thermoplastic bag and out of a trash receptacle. In turn, such compromising of the top of the bag can lead to trash spillage, require an adjusted/awkward carrying position or method, etc.

Furthermore, conventional thermoplastic bags include lamination or bonds between layers. For example, conventional thermoplastic bags include heat seals in the form of side seals and hem seals. Lamination or bonds formed by heat and pressure can create stress concentrations in thermoplastic films. Such stress concentrations are often points of weakness at which tears or leaks occur, particularly in thinner bags.

BRIEF SUMMARY

One or more implementations of the present disclosure solve one or more problems in the art with multi-film thermoplastic bags including a zone of contact areas between adjacent films with varying lamination. The contact areas comprise areas in which at least first and second thermoplastic films of the multi-film thermoplastic bag are in intimate contact and bonded together by heat and pressure. The contact areas can help reinforce the bag due to increased stiffness provided by the contact areas, as well as distribute stresses/stain over more material, and thereby, help reduce tearing or other damage by stresses/strain from grasping fingers (e.g., during a grabbing motion to lift or carry) or objects being placed inside the bag. Additionally, the increased stiffness can provide a tactile feel that connotes strength to a user grasping the grab zone. Thus, the contact areas provide tactile cues to the consumer about the strength and quality of the multi-film thermoplastic bag.

As mentioned above, in one or more implementations, the zone of contact areas includes varying levels of lamination. In other words, the zone of contact areas comprises a first plurality of contact areas bonding at least first and second thermoplastic films of the multi-film thermoplastic bag together with a first lamination strength. The zone of contacts areas comprises a second plurality of contact areas bonding at least the first and second thermoplastic films of the multi-film thermoplastic bag together with a second lamination strength that is less than the first lamination strength. In one or more implementations, the first plurality of contact areas are positioned into a first region of the zone of contact areas and the second plurality of contact areas are positioned in a second region of the zone of contact areas.

Thus, the differing levels of lamination can allow for regions of higher lamination and regions of lower lamination. The regions of higher lamination can provide increased stiffness and can help prevent de-lamination of the first and second thermoplastic films. The regions of lower lamination can help prevent or reduce material damage to the first and second thermoplastic films where higher lamination is not needed, thereby, preventing or reduce stress concentrations that could lead to failure.

For example, an implementation of a multi-film thermoplastic bag includes a first multi-film sidewall and a second multi-film sidewall. The first multi-film sidewall comprising a first thermoplastic film layer and a second thermoplastic film layer. The second multi-film sidewall comprising a third thermoplastic film layer and a fourth thermoplastic film layer. The multi-film thermoplastic bag also comprises a zone of contact areas. The zone of contact areas includes a first region and a second region. Contact areas in the first region have a first lamination strength. Contact areas in the second region have a second lamination strength that is less than the first lamination strength. Additionally, each of the contact areas comprises a flat in-plane area bonding the first thermoplastic film layer and the second thermoplastic film layer together.

Additionally, an implementation of the multi-film thermoplastic bag include an outer first thermoplastic bag including first and second opposing sidewalls joined together along a first side edge, an opposite second side edge, an open top edge, and a closed bottom edge. The multi-film thermoplastic bag further includes an inner second thermoplastic bag positioned within the first thermoplastic bag, the second thermoplastic bag including third and fourth opposing sidewalls joined together along a first side edge, an opposite second side edge, an open top edge, and a closed bottom edge, the first and second thermoplastic bags folded over a draw tape along the open top edges. The multi-film thermoplastic bag further includes a zone of contact areas, wherein contacts areas in the zone of contact areas for a uniform, repeating pattern. The contact areas in the zone of contact areas comprise flat, in-plane areas bonding the first sidewall to the third sidewall or the second sidewall to the fourth sidewall. Additionally, a lamination strength of a first plurality of contact areas in the zone of contact areas is tailored to vary from a lamination strength of a second plurality of contact areas in the zone of contact areas.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 1A-1C show partial side cross-sectional views of films having varying numbers of layers according to one or more implementations of the present disclosure;

FIG. 2 shows a partial side cross-sectional view of a multi-film thermoplastic bag having contact areas between first and second thermoplastic film according to one or more implementations of the present disclosure;

FIGS. 3A-3B show views of a set of contact rollers for forming contact areas according to one or more implementations of the present disclosure;

FIG. 3C shows a perspective view of another set of contact rollers for forming contact areas according to one or more implementations of the present disclosure;

FIG. 3D shows a perspective view of yet another set of contact rollers for forming contact areas according to one or more implementations of the present disclosure;

DETAILED DESCRIPTION

Figure 3E:
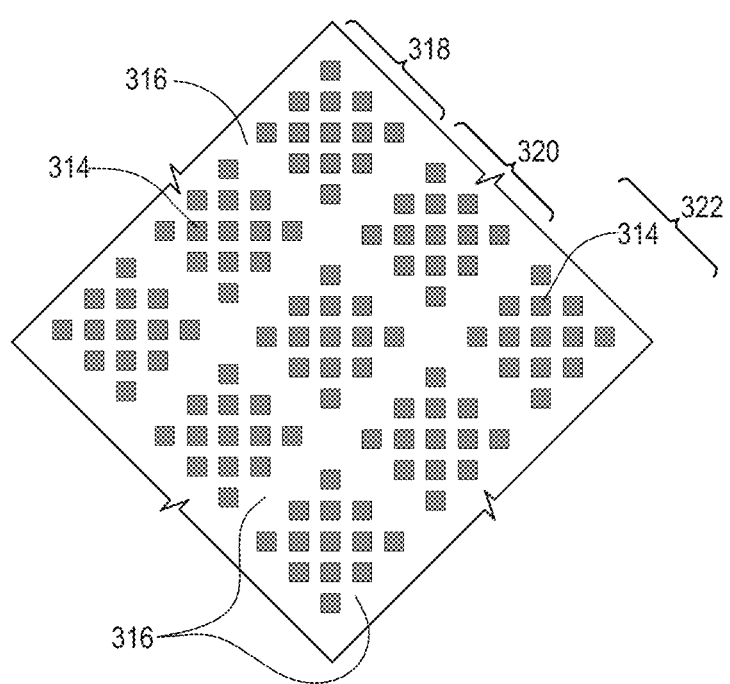
FIG. 3E shows a view of a portion of a multi-film thermoplastic bag having contact areas created by the contract rollers of FIG. 3A or 3C according to one or more implementations of the present disclosure.

One or more implementations include multi-film thermoplastic bags including contact areas between adjacent films with varying lamination. The contact areas comprise areas in which at least first and second thermoplastic films of the multi-film thermoplastic bags are in intimate contact and bonded together. The multi-film thermoplastic bags include a zone of contact areas in which the lamination strength of a first plurality of contact areas in the zone of contact areas is tailored to vary from a lamination strength of a second plurality of contact areas in the zone of contact areas. The zone of contact areas comprises a first plurality of contact areas bonding at least first and second thermoplastic films of the multi-film thermoplastic bag together with a first lamination strength. The zone of contacts areas comprises a second plurality of contact areas bonding at least the first and second thermoplastic films of the multi-film thermoplastic bag together with a second lamination strength that is less than the first lamination strength.

In one or more implementations, the first plurality of contact areas are positioned into a first region of the zone of contact areas and the second plurality of contact areas are positioned in a second region of the zone of contact areas. Thus, the differing levels of lamination can allow for regions of higher lamination strength and regions of lower lamination strength. The regions of higher lamination strength can provide increased stiffness and can help prevent de-lamination of the first and second thermoplastic films. The regions of lower lamination strength can help prevent or reduce material damage to the first and second thermoplastic films where stronger lamination is not needed, thereby, preventing or reduce stress concentrations that could lead to failure.

For example, in one or more implementations, regions of contact areas with higher lamination strength are positioned in the multi-film bag at positions where users commonly grab or where users commonly hold the multi-film bag. Specifically, the contact areas with higher lamination strength can help reinforce the multi-film bag due to increased stiffness provided by the contact areas, and thereby, help reduce tearing or other damage by stresses/strain from grasping fingers (e.g., during a grabbing motion to lift or carry). Additionally, the increased stiffness can provide a tactile feel that connotes strength to a user. Thus, the contact areas with higher lamination strength provide tactile cues to the consumer about the strength and quality of the multi-film thermoplastic bag.

Relatedly, in one or more implementations, regions of contact areas with lower lamination strength are positioned in the multi-film bag at positions where users do not commonly grab or hold the multi-film bag. For example, in one or more implementations, the regions of contact areas with lower lamination strength are positioned in the middle of the multi-film bag. Also, in one or more implementations, contact areas with lower lamination strength are positioned along the bottom of the multi-film bag.

In one or more implementations, the multi-film bag includes a zone of contact areas in which the lamination strength of the contact areas varies along the transverse direction. For example, the multi-film bag includes contact areas with higher lamination strength in the grab zone and contact areas with lesser lamination strength in the middle of the multi-film bag. Alternatively, the multi-film bag includes a zone of contact areas in which the lamination strength of the contact areas varies along the machine direction. For example, the multi-film bag includes contact areas with higher lamination strength in the center of the multi-film bag and contact areas with lesser lamination strength toward the side edges of the multi-film bag. In still further implementations, the multi-film bag includes a zone of contact areas in which the lamination strength of the contact areas varies along the transverse direction and the machine direction. In still further implementations, the multi-film bag includes a zone of contact areas in which the lamination strength of the contact areas forms a gradient with the lamination strength consistently increasing across the zone of contacts in one or more of the machine direction or the transverse direction.

As mentioned above, in one or more implementations, the grab zone of a multi-film bag includes contact areas with varying lamination strength. For example, a multi-film thermoplastic bag can include a top edge that is folded over to create a hem channel. The top edge may be folded over at a top edge when forming the hem channel and a draw tape may be inserted into a hem channel. In one or more implementations, the folded over top edges of the multi-film thermoplastic bag form a hem skirt extending from the hem channel. For example, when the top edge of a multi-film thermoplastic bag is folded over toward the inside volume of the bag to create a hem channel, the portions of the top edge that extend from the hem channel down the inside surface of the bag create a hem skirt. In at least one implementation, the hem channel is secured by a hem seal. In one or more embodiments, the zone of contact areas is positioned directly below the hem seal in the grab zone and secure the end of the hem skirt to the inside of the multi-film thermoplastic bag. Thus, the contact areas can supplement the hem seal and provide a back-up to the hem seal in the event of unintended low lamination levels in the hem seal.

Additionally, or alternatively, in one or more implementations, the contact areas with higher lamination strength are positioned to replace a traditional heat seal. For example, in one or more implementations, contact areas with higher lamination strength replace a traditional hem seal to create a hem channel that houses a draw tape. Thus, instead of a single hem seal, such implementations include a plurality of discrete contact areas with higher lamination strength. The higher lamination strength can help prevent or reduce delamination of the bonds created by the contact areas of higher lamination strength and opening of the hem channel.

In still further implementations, the contact areas with higher lamination strength are positioned along the bottom edge of the hem skirt. The contact areas with higher lamination strength can help ensure that the hem skirt stays bonded to the sidewall of the multi-film bag. Thus, the contact areas with higher lamination strength can help ensure that the grab zone of the multi-film bag remains reinforced by the hem skirt rather than the end of the hem skirt extending unattached into the interior of the multi-film bag.

The varying degree of lamination of the contact areas is created by one or more processes or conditions. For example, in one or more implementations, greater lamination strength is created by one or more of increased heat and/or pressure during the formation of the contact areas. Additionally, or alternatively, varying lamination strength is created by the varying the number of layers or films in the zone of contact areas. Specifically, the thinner the layers or the lesser the number of layers that are secured by the contact areas, the greater the lamination strength. In still further implementations, the strength of the lamination of the contact areas is varied based on the material or material properties of the layers that are bonded by the contact areas. For example, one or more implementations include varying the gloss or surface roughness of one or more layers to tailor the lamination strength of the contact areas.

Moreover, in one or more implementations, the contact areas in the grab zone of a multi-film thermoplastic bag can bring a surface of the multi-film thermoplastic bag and the hem skirt into intimate contact. For example, when the hem skirt extends down an inner surface of a multi-film thermoplastic bag, the contact areas can bring portions of the multiple films of the multi-film thermoplastic bag into intimate contact while further bringing portions of the hem skirt into intimate contact with at least one surface of the bag (e.g., an inner surface of the bag). In some implementations, the contact areas cover the entirety of the hem skirt. In other implementations, the contact areas cover a portion of, or none of, the hem skirt.

In some implementations, the hem skirt may include an extended length to form an extended hem skirt. In particular, one or both of the layers of the hem skirt can extend down from the hem channel to cover at least a portion of the grab zone. An extended hem skirt with three or four layers can reinforce the grab zone by providing additional layers of thermoplastic material, and thereby, reduce puncturing, tearing, or other damage in the grab zone. Furthermore, the contact areas can secure the extended hem skirt to the layers of the sidewall of the multi-film thermoplastic bag. The contact areas can thus restrict relative movement between the layers in the grab zone, and thereby, provide a sensory signal of increased strength in the grab zone.

In one or more implementations, the methods described herein organize the contact areas between the films of a multi-film thermoplastic bag into a pattern. For example, the pattern can be continuous or discrete, and can include varying densities of pattern elements. Additionally, the multi-film thermoplastic bag may include the pattern of contact areas over various percentages of the area of the multi-film thermoplastic bag (e.g., both within the grab zone and outside of the grab zone). For example, in or more implementations, the contact areas form a pattern that uniformly spans the zone of contact areas. In alternative implementations, the contact areas can form a pattern that creates a wavy or uneven bottom edge. The wavy or uneven bottom edge of the pattern creates areas of lower linear force density across the width of the grab zone as compared to a uniform pattern of contact areas. This can provide lower stress on the material due to a wide distribution of forces from the local application of lift force at the top of the bag when removing the bag from a receptacle.

In some implementations, when viewing the first thermoplastic film, the contact areas between the first and second thermoplastic films differ in appearance (e.g., a different color) than areas of the first thermoplastic film not in intimate contact with the second thermoplastic film. The differing appearance of the contact areas in the grab zone can provide a look that connotes increased strength to a user. The differing appearance of the contact areas in the grab zone can be visible both from the outside of the bag (i.e., when viewing the outside of the outer layer of the bag) and from the inside of the bag (i.e., when viewing the inside of the inner layer of the bag). Thus, by positioning the contact areas in the grab zone, (a highly visible area) the contact areas provide visual cues to the consumer about the strength and quality of the multi-film thermoplastic bag.

Moreover, when films of a multi-film thermoplastic bag have different appearances, due to the inclusion of a pigment or other coloring agent, the contact areas cause the appearance of areas of visual contrast in adjacent films. For example, in a two-film thermoplastic bag where the first thermoplastic film is a light color and the second thermoplastic film is a dark color, intimate contact between the two films cause a wetting effect in an area of the first thermoplastic film. For instance, the intimate contact removes air from between portions of the two films such that the color of the second thermoplastic film shows through the first thermoplastic film. Thus, in this example the contact areas cause a dark area to appear in the lighter first thermoplastic film. Thus, the contact areas can create intimate contact between a portion of a first film and a portion of a second film causing the area of intimate contact to take on the visual characteristics of one of the films. Alternatively, the area of the intimate contact can take on a visual appearance that is a blending of the first and second films, or an appearance that is different from both the first and second films.

One will appreciate in light of the disclosure here that portions of the films of a multi-film thermoplastic bag can be brought into intimate contact with each other using various techniques. In particular, one or more implementations involve utilizing heat and pressure on the films of the multi-film thermoplastic bag to bring the films together and create the contact areas. Furthermore, one or more implementations involve controlling the amount of heat and pressure to tailor the properties of the areas forming the contact areas. For example, in one or more implementations enough heat and pressure are applied so as to bring the films into intimate contact but not so much as to degrade the strength or otherwise weakening the films. For example, in one or more implementations a strength of the films in the contact areas is not substantially weakened. More particularly, in one or more implementations a transverse-direction tensile strength of the films with contact areas is not significantly lower than the areas of the films not including the contact areas. Still further, in one or more implementations, an impact strength (e.g., as measured by a dart drop test) of the films with contact areas is not significantly lower than the areas of the films not including the contact areas.

As used herein, the terms "lamination," "laminate," and "laminated film," refer to the process and resulting product made by bonding together two or more layers of film or other material. The term "bonding," when used in reference to bonding of multiple films of a multi-film bag, may be used interchangeably with "lamination" of the layers. According to one or more implementations, adjacent films of a multi-film bag are laminated or bonded to one another.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, heat bonding, and the like) two or more separately made film articles to one another so as to form a multi-film bag. As a noun, "laminate" means a product produced by the affixing or adhering just described.

In one or more implementations, the contact areas between films of a multi-film bag may be continuous. As used herein, a "continuous" area of contact areas refers to one or more contact areas that are continuously positioned in an area, and arranged in the machine direction, in the transverse direction, or in an angled direction.

In one or more implementations, the contact areas between films of a multi-film bag may be in a discrete or non-continuous pattern (i.e., discontinuous or partially discontinuous). As used herein, a "discrete pattern" of contact areas refers to a non-repeating pattern of pattern elements in the machine direction, in the transverse direction, or in an angled direction.

In one or more implementations, the contact areas between films of a multi-film bag may be in a partially discontinuous pattern. As used herein, a "partially discontinuous" pattern of contact areas refers to pattern elements that are substantially continuous in the machine direction or in the transverse direction, but not continuous in the other of the machine direction or the transverse direction. Alternately, a partially discontinuous pattern of contact areas refers to pattern elements that are substantially continuous in the width of the article but not continuous in the height of the article, or substantially continuous in the height of the article but not continuous in the width of the article. Alternatively, a partially discontinuous pattern of contact areas refers to pattern elements that are substantially continuous for a width and height that is less than the width and height of the article. More particularly, a partially discontinuous pattern of contact areas refers to repeating pattern elements broken up by repeating separated areas in either the machine direction, the transverse direction, or both. Both partially discontinuous and discontinuous patterns are types of non-continuous heated pressure bonding (i.e., bonding that is not complete and continuous between two surfaces).

One or more implementations involve bringing pigmented, lightly pigmented, and/or substantially un-pigmented thermoplastic films into intimate contact. As used herein, the term "substantially un-pigmented" refers to a thermoplastic ply or plies that are substantially free of a significant amount of pigment such that the ply is substantially transparent or translucent. For example, a "substantially un-pigmented" film can have a pigment concentration (i.e., percent of total composition of the film) that is between 0% by weight and 2% by weight. In some embodiments, a "substantially un-pigmented" film can have a pigment concentration between about 0% by weight and about 1% by weight. In further embodiments, a "substantially un-pigmented" film can have a pigment concentration between about 0% by weight and about 0.75% by weight. A substantially un-pigmented film can have a transparent or translucent appearance.

As used herein, the term "lightly pigmented" refers to a thermoplastic ply or plies that are pigmented such that, when placed into intimate contact with a pigmented film, an unexpected appearance is produced. For example, the unexpected appearance can be a "wetting" of a color of the pigmented film through the lightly pigmented film. Alternately, the unexpected appearance may be an effect that differs from an appearance (e.g., colors) of the individual films. If a film has too much pigment, when placed into intimate contact with another pigmented film, an unexpected appearance will not be produced. The amount of pigment in a lightly pigmented film that will produce the unexpected appearance can be dictated by the thickness of the film.

A pigmented film can comprise a lightly pigmented film or a film with a greater percentage of pigment than a lightly pigmented film. As mentioned above, in one or more embodiments, a first thermoplastic film is substantially un-pigmented or lightly pigmented and a second thermoplastic film is pigmented. Thus, in one or more embodiments, the second thermoplastic layer has a greater percentage of pigment than the first thermoplastic layer. Alternatively, the first and second thermoplastic layers have the same percentage of pigment but the first thermoplastic layer comprises a lighter pigment than a pigment of the second thermoplastic layer.

As used herein, the term "pigment or pigments" are solids of an organic and inorganic nature which are defined as such when they are used within a system and incorporated into the thermoplastic film, absorbing part of the light and reflecting the complementary part thereof which forms the color of the thermoplastic ply. Representative, but not limiting, examples of suitable pigments include inorganic colored pigments such as such as iron oxide, in all their shades of yellow, brown, red and black; and in all their physical forms and particle-size categories, chromium oxide pigments, also co-precipitated with nickel and nickel titanates, blue and green pigments derived from copper phthalocyanine, also chlorinated and brominated in the various alpha, beta and epsilon crystalline forms, yellow pigments derived from lead sulphochromate, yellow pigments derived from lead bismuth vanadate, orange pigments derived from lead sulphochromate molybdate lead oxide, cadmium sulfide, cadmium selenide, lead chromate, zinc chromate, nickel titanate, and the like. For the purposes of the present invention, the term "organic pigment" comprises also black pigments resulting from organic combustion (so-called "carbon black"). Organic colored pigments include yellow pigments of an organic nature based on arylamides, orange pigments of an organic nature based on naphthol, orange pigments of an organic nature based on diketo-pyrrolo-pyrole, red pigments based on manganese salts of azo dyes, red pigments based on manganese salts of beta-oxynaphthoic acid, red organic quinacridone pigments, and red organic anthraquinone pigments. Organic colored pigments include azo and diazo pigments, phthalocyanines, quinacridone pigments, perylene pigments, isoindolinone, anthraquinones, thioindigo, solvent dyes and the like.

Pigments can be light reflecting (e.g., white pigments) or light absorbing (e.g., black pigments). Examples of pigments suitable for one or more implementations include titanium dioxide, Antimony Oxide, Zinc Oxide, White Lead, Lithopone, Clay, Magnesium Silicate, Barytes (BaSO4), and Calcium Carbonate (CaCO3).

As used herein, the term "grab zone" refers to a portion of a thermoplastic bag that is subjected to an applied load (e.g., a lifting force to lift or carry the thermoplastic bag). In particular, the grab zone includes a top portion of a thermoplastic bag (e.g., above and/or below a hem seal). For example, the grab zone extends from a first side edge to an opposing second side edge and from proximate (e.g., immediately adjacent to or within a threshold distance from) the top opening a first distance toward the bottom fold. As another example, the grab zone extends from a first side edge to an opposing second side edge and from the hem seal a second distance (equivalent or different from the first distance) toward the bottom fold. As a further example, the grab zone extends from a first side edge to an opposing second side edge and from the hem seal a third distance (equivalent or different from the first and second distances) to a hem skirt seal toward the bottom fold.

Film Materials

As an initial matter, the thermoplastic material of the films of one or more implementations of the present disclosure may include thermoplastic polyolefins, including polyethylene and copolymers thereof and polypropylene and copolymers thereof. The olefin-based polymers may include ethylene or propylene based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly(ethylene-butylacrylate), polyurethane, poly(ethylene-propylene-diene), ethylene-propylene rubber, nylon, etc.

Some of the examples and description herein below refer to films formed from linear low-density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926). One will appreciate that the present disclosure is not limited to LLDPE and can include "high density polyethylene" (HDPE), "low density polyethylene" (LDPE), and "very low density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and bags that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional film-making processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a film with layers having different compositions. Such multi-film bag may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

As described above, a multi-film thermoplastic bag includes a plurality of thermoplastic films. Each individual film may itself include a single layer or multiple layers. In other words, the individual films of the multi-film bag may each themselves comprise a plurality of layers. Such layers may be significantly more tightly bonded together than the bonding (if any) of the contact areas. Both tight and relatively weak bonding can be accomplished by joining layers by mechanical pressure, joining layers with heat, joining with heat and pressure, joining layers with adhesives, spread coating, extrusion coating, ultrasonic bonding, static bonding, cohesive bonding, and combinations thereof. Adjacent sub-layers of an individual film may be coextruded. Coextrusion results in tight bonding so that the bond strength is greater than the tear resistance of the resulting laminate (i.e., rather than allowing adjacent layers to be peeled apart through breakage of the lamination bonds, the film will tear).

A thermoplastic film can may include a one, two, three, or more layers of thermoplastic material. FIGS. 1A-1C are partial cross-sectional views of films that can be included in a multi-film thermoplastic bag of one or more implementations. In some implementations, the film may include a single layer film 102a, as shown in FIG. 1A, comprising a single first layer 110. In other embodiments, the film can comprise a two-layer film 102b as shown in FIG. 1B, including the first layer 110 and a second layer 112. The first and second layers 110, 112 can be coextruded. In such implementations, the first and second layers 110, 112 may optionally include different grades of thermoplastic material and/or include different additives, including polymer additives and/or pigments. In yet other implementations, a film be a tri-layer film 102c, as shown in FIG. 1C, including the first layer 110, the second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

In one example, the film 102a can comprise a 0.5 mil, 0.920 density LLDPE, colored film containing 4.8% pigment that appears a first color. In an alternative embodiment, the film 102a can comprise a 0.5 mil, 0.920 density LLDPE, un-pigmented film that appears clear or substantially clear. In still further embodiments, the film 102a can comprise a 0.5 mil, 0.920 density LLDPE, pigmented film that appears a second color.

In at least one implementation, such as shown in FIG. 1C, a multilayered film 102c can include co-extruded layers. For example, the film 102c can include a three-layer B:A:B structure, where the ratio of layers can be 20:60:20. The exterior B layers (i.e., the first layer 110, and the third layer 114) can comprise a mixture of hexene LLDPE of density 0.918, and metallocene LLDPE of density 0.920. The interior A core layer (i.e., the second layer 112) can comprise a mixture of hexene LLDPE of density 0.918, butene LLDPE of density 0.918, reclaimed resin from trash bags. Additionally, the A core layer (i.e., the second layer 112) can include a pigment. For example, the A core layer can include a colorant in an amount between about 0.1 percent and about 6%.

In another example, the film 102c is a coextruded three-layer B:A:B structure where the ratio of layers is 15:70:15. The B:A:B structure can also optionally have a ratio of B:A that is greater than 20:60 or less than 15:70. In one or more implementations, the LLDPE can comprise greater than 50% of the overall thermoplastic material in the film 102c.

In another example, the film 102c is a coextruded three-layer C:A:B structure where the ratio of layers is 20:60:20. The C layer (i.e., the third layer 114) can comprise a LLDPE material with a first colorant (e.g., black). The B layer (i.e., the second layer 112) can also comprise a LLDPE material with a second colorant (e.g., white). The LLDPE material can have a MI of 1.0 and density of 0.920 g/cm3. The A core layer (i.e., the first layer 110) can comprise similar materials to any of the core layer describe above. The A core layer can comprise a black colorant, a white colorant, or can be clear.

In still further embodiments, a film can comprise any number of co-extruded layers. More particularly in one or more embodiments, a film can comprise any number of co-extruded layers so long as the A and B layers do not alternate such that the A layers are on one side and the B layers are on the other side. In still further embodiments, a film can comprise one or more co-extruded layers between the A and B layers. For example, the film can comprise clear or transparent layers between the A and B layer(s). In still further embodiments, a film can comprise intermittent layers of different colors in addition to the A and B layer(s).

FIG. 2 illustrates one example of a portion of a sidewall of a multi-film thermoplastic bag 202 including contact areas 210 between a first thermoplastic film 204 and a second thermoplastic film 206. Each of the thermoplastic films 204, 206 can comprise any of the thermoplastic films 102a-102c described above or a film with more than three layers. FIG. 2 illustrates that the first thermoplastic film 204 of the multi-film thermoplastic bag 202 is secured to the second thermoplastic film 206 via contact areas 210. In particular, the multi-film thermoplastic bag 202 can include contact areas 210 and separated areas 208. The contact areas 210 remove the air and/or space between the thermoplastic films 204, 206. FIG. 2 illustrates exaggerated separated areas (e.g., air gaps) 208 to illustrate that the films are separated or not in intimate contact in the areas surrounding the contact areas 210.

In one or more implementations, the contact areas 210 are flat (e.g., in-plane) and undeformed (e.g., not substantially stretched or deformed out of plane). In other words, the gauge of each of the films 204, 206 is consistent across the contact areas 210. Indeed, in contrast to incrementally stretching the films as done in ring rolling and SELFing, the thermoplastic films 204, 206 are smashed or pushed together to form the contact areas 210.

As shown by FIG. 2, the contact areas 210 can comprise areas in which the first thermoplastic film 204 is in direct, or intimate, contact with the second thermoplastic film 206. As such, the contact areas 210 can create regions that are visually distinct from the rest of the multi-film thermoplastic bag 202 (at least when viewing the major surface of the first thermoplastic film 204). In other words, because the first thermoplastic film 204 is directly abutted against the second thermoplastic film 206, the contact areas 210 can have the color or appearance of the second thermoplastic film 206 or another color or appearance that differs from the separated portions of the first thermoplastic film 204.

For example, in one or more implementations, the second thermoplastic film 206 can comprise a pigmented film and have a black appearance while the first thermoplastic film 204 is substantially un-pigmented or lightly pigmented and have a clear, transparent, or cloudy appearance. When combined to form a multi-film thermoplastic bag 202 in accordance the principles described herein, the first thermoplastic film 204 as part of the multi-film thermoplastic bag 202 can have a color or appearance that differs from the color of the first thermoplastic film 204. For example, the first thermoplastic film 204 can have a metallic, silvery metallic or light grey color rather than a black appearance or color as would be expected (i.e., due to viewing the second thermoplastic film 206 through a clear or transparent film). The regions or areas of the two films in intimate contact with each other create contact areas that have a color or appearance that differs from the color or appearance of the first thermoplastic film 204. For example, the contact areas 210 can have the color or appearance of the second thermoplastic film 206 (e.g., black).

In one or more alternative implementations, the first thermoplastic film 204 comprises a light colorant while the second thermoplastic film 206 comprises a dark colorant. As used herein, a light colorant is a color with a brightness closer to the brightness of white than the brightness of black. As used herein, a dark colorant is a color with a brightness closer to the brightness of black than the brightness of white. In one or more embodiments, the first thermoplastic film 204 has a concentration of light colorant between about 1% by mass and about 15% by mass. More particularly, in one or more embodiments, the first thermoplastic film 204 has a concentration of light colorant between about 2% by mass and about 12% by mass. In still further embodiments, the first thermoplastic film 204 has a concentration of light colorant between about 5% by mass and about 10% by mass.

Still further, the second thermoplastic film 206 has a concentration of dark colorant between about 1% by mass and about 15% by mass. More particularly, in one or more embodiments, the second thermoplastic film 206 has a concentration of dark colorant between about 2% by mass and about 12% by mass. In still further embodiments, the second thermoplastic film 206 has a concentration of dark colorant between about 5% by mass and about 10% by mass.

The white colored first thermoplastic film 204, when part of the multi-film thermoplastic bag 202 can have a gray appearance. The foregoing described color change may give the appearance of a third color without requiring the actual colorant mixture of the third color to be within the multi-film thermoplastic bag 202. In other words, the bag can be devoid of a gray pigment. For example, it may allow a film having a viewable black layer and a viewable white layer to have (i.e., mimic) a gray appearance (often a consumer preferred color). Furthermore, the foregoing described color change may allow the film to mimic a gray appearance without significantly increasing and/or reducing a transparency (i.e., light transmittance) of the film. In other words, the foregoing described color change may allow the multi-film thermoplastic bag 202 to mimic a gray appearance without detrimentally affecting an appearance of quality of the film.

Thus, the contact areas have a color or appearance that differs from the color or appearance of the first thermoplastic film 204. For example, the contact areas 210 can have the color or appearance of the second thermoplastic film 206 (e.g., black) or another color. One will appreciate in light of the disclosure herein that black and white are used as exemplary colors for ease in explanation. In alternative embodiments, the films can comprise other color combinations such as white and blue, yellow, and blue, red, and blue, etc.

Irrespective of the specific colors of the first and second thermoplastic films, the contact areas 210 can have a substantial change in appearance compared to the separated areas 208 when viewed from the first thermoplastic film side of the multi-film thermoplastic bag 202. In some embodiments, for example, when using the LAB color space, a represents a measurement of green and magenta values, b represents a measurement of blue and yellow values, and L represents a measurement of lightness (i.e., white and back values). In some embodiments, the change in appearance of the contact areas 210 comprises a color change in which the L value decreases by at least five points. In some embodiments, the change in appearance of the contact areas 210 comprises a color change in which the L value decreases between five and forty points, between five and thirty points, or between five and twenty points.

For example, the change in appearance of the contact areas 210 may include a perceivable change of color from gray to black. In additional embodiments, the change in appearance of the contact areas 210 may include a perceivable change of color from a first relatively lighter color to a second darker color. For example, the change in appearance may include perceivable change of color from a first light gray to a second dark gray. In other implementations, the change in appearance may include perceivable change of color from a first lighter version of any color to a second darker version of the same color.

As another example, it may allow a film having a viewable blue layer (with a back yellow layer) to have (i.e., mimic) a green appearance. Furthermore, the foregoing described color change may allow the film to mimic a green appearance without significantly increasing and/or reducing a transparency (i.e., light transmittance) of the film. In other words, the foregoing described color change may allow the film to mimic a green appearance without detrimentally affecting an appearance of quality of the film. As a result of the foregoing, the multi-layer film of the present disclosure may provide a multi-layer film having a particular appearance (e.g., a green appearance) while reducing costs. One will appreciate that other color combination in addition to white/black producing grey and yellow/blue producing green are possible and the foregoing are provided by way of example and not limitation.

FIG. 2 further illustrates that the contact areas 210 secure the thermoplastic films 204, 206 of the multi-film thermoplastic bag 202 such that the thickness of the thermoplastic films 204, 206 is substantially unchanged at each of the contact areas 210. In other words, each of the first and second thermoplastic films 204, 206 can have a substantially uniform gauge (e.g., are substantially flat). In other words, the gauge of the first and second thermoplastic films 204, 206 in the separated areas 208 is substantially the same as the gauge of the first and second thermoplastic films 204, 206 in the contact areas 210. This is in contrast to ring rolled, SELF'ed, conventional embossing, or other processes that can bond film layers together, while also deforming portions of the films. As mentioned above, the heat, pressure, and depth of engagement during creation of the contact areas can control to what extent, if any, the thermoplastic films are deformed when forming the contact areas 210. In one or more implementations, the process of forming the contact areas 210 does not deform, or does not substantially deform, the thermoplastic films such that they are flat, or appear flat, despite the presence of contact areas 210. In alternative implementations, the portions of the first and second thermoplastic films comprising the contact areas 210 create an increase or decrease in the gauge or loft of the multi-film thermoplastic bag 202.

In one or more implementations, the creation of the contact areas 210 does not weaken the first and second thermoplastic films 204, 206. For example, in one or more implementations, film strength in the portions of the first and second thermoplastic films 204, 206 comprising the contact areas 210 is not significantly lower than the portions of the first and second thermoplastic films 204, 206 in the areas 208 of separation. In particular, in one or more implementations, film in the contact areas 210 have transverse direction tensile strength that is the same as the film in the separated areas 208.

Moreover, the creation of the contact areas 210 can create other tactile features in the multi-film thermoplastic bag 202. For example, regions of the multi-film thermoplastic bag 202 including the contact areas 210 can have an increased rigidity over other regions of the multi-film thermoplastic bag 202 without contact areas. In some implementations, the contact areas 210 may increase the rigidity of the multi-film thermoplastic bag 202 by a factor of one. In other implementations, the contact areas 210 may increase the rigidity of the multi-film thermoplastic bag 202 by as much as a factor of three. Alternatively, the contact areas 210 may not increase the rigidity of the multi-film thermoplastic bag 202 at all.

As mentioned above, the strength of lamination of the bonds created by the contact areas 210 varies within a pattern of contact areas. Specifically, one or more contact areas 210 have a higher or stronger lamination strength and one or more contact areas 210 have a lower or weaker lamination strength. As used herein, higher or stronger lamination strength is a relative term relative to lower or weaker lamination strength. In other words, higher or stronger lamination strength is a lamination strength that is greater than a lower or weaker lamination strength. Similarly, a lower or weaker lamination strength is a lamination strength that is less than a higher or stronger lamination strength.

For example, in one or more implementations, the contact areas with a higher or stronger lamination strength have a lamination strength that is at least 1.25 times a lamination strength of the contact areas with the lower or weaker lamination strength. More specifically, in one or more implementations, the contact areas with a higher or stronger lamination strength have a lamination strength that is between 1.25 and 5 times a lamination strength of the contact areas with the lower or weaker lamination strength. In some implementations, the contact areas with a higher or stronger lamination strength have a lamination strength that is between 1.5, 2.0, 2.5, 3.0, 3.5, 4.0, or 4.5 times a lamination strength of the contact areas with the lower or weaker lamination strength.

In one or more implementations, the contact areas with greater lamination strength between adjacent layers of multi-film bags in accordance with one or more implementations can have a lamination strength that is greater than a weakest tear resistance of each of the individual films such one or more of the films will tear or otherwise fail prior to the bonds of the contact areas with greater lamination strength to break when subjected to peel forces within a given range. Indeed, one or more implementations include contact areas that do not release between films of a multi-film thermoplastic bag prior to any localized tearing of the films of the multi-film thermoplastic bag.

Thus, in one or more implementations, the contact areas with higher lamination strength will not fail before one or more of the individual layers undergoes molecular-level deformation. For example, an applied strain will not pull the contact areas with higher lamination strength apart prior to molecular-level deformation (stretching, tearing, puncturing, etc.) of the individual film layers. In other words, the contact areas with higher lamination strength can provide more resistive force to an applied strain than molecular-level deformation of individual films of the multi-film bag.

On the other hand, the contact areas with lower or weaker lamination strength between adjacent layers of multi-film bags in accordance with one or more implementations can act to first absorb forces via breaking prior to allowing those same forces to cause failure of the individual films of the multi-film bag when subjected to peel forces. Such action can provide increased strength to the multi-film thermoplastic bag. In one or more implementations, the contact areas with lower or weaker lamination strength include a bond strength that is less than a weakest tear resistance of each of the individual films so as to cause the bonds of the contact areas with lower or weaker lamination strength to fail prior to failure of the films when subjected to peel forces within a given range. Indeed, one or more implementations include contact areas with lower or weaker lamination strength that release between films of a multi-film thermoplastic bag prior to any localized tearing of the films of the multi-film thermoplastic bag.

Thus, in one or more implementations, the contact areas with lower or weaker lamination strength with can fail before either of the individual layers undergoes molecular-level deformation. For example, an applied strain can pull the contact areas with lower or weaker lamination strength apart prior to any molecular-level deformation (stretching, tearing, puncturing, etc.) of the individual film layers. In other words, the contact areas with lower or weaker lamination strength can provide less resistive force to an applied strain than molecular-level deformation of individual films of the multi-film bag. Such a configuration of contact areas with lower or weaker lamination strength can provide increased strength properties to the multi-film thermoplastic bag as compared to a monolayer film of equal thickness or a multi-film bag in which the plurality of layers are tightly bonded together (e.g., coextruded). Thus, contact areas with lower or weaker lamination strength are particularly advantageous when force or strain is applied to the bag (e.g., when items are pushed or shoved into the bag), the contact areas with lower or weaker lamination strength will release before the layers of the bag experience molecular-level deformation (e.g., such as with a puncture, tear, or rip).

In still further implementations, the contact areas with higher or stronger lamination strength and the contact areas with lower or weaker lamination strength can include a bond strength that is less than a weakest tear resistance of each of the individual films so as to cause the bonds of the contact areas with higher or stronger lamination strength and the contact areas with lower or weaker lamination strength to fail prior to failure of the films when subjected to peel forces within a given range.

As mentioned above, in one or more implementations, the bond or lamination strength of the contact areas is tailored to vary based on processing the processing conditions used to produce the contact areas. Specifically, as described in relation to FIGS. 3A-3D, in one or more implementations, the pressure and/or heat applied to create the contact areas can vary across a zone of contact areas so as to create contact areas with differing lamination strength.

FIGS. 3A-3D illustrate various implementations of contact rollers for forming contact areas. For example, as shown in FIG. 3A, the contact rollers include a punch roll 302 and a cooperating die roll 304. Each of the punch roll 302 and the die roll 304 may be cylindrical and may have longitudinal axes that are parallel to each other. The punch roll 302 and the die roll 304 may define a passage or tooling nip therebetween through which film materials may pass through to form the contact areas. As shown in FIG. 3A, the punch roll 302 is provided with punch elements 308 and the die roll 304 is provided with corresponding die regions 306 for cooperating with, or receiving, the punch elements 308.

As illustrated in the enlargement shown in FIG. 3B, the punch elements 308 may each have a plurality of punch elements for cooperating with corresponding die elements in the die regions 306. The cooperating engagement of the punch elements with the die elements, with one or more thermoplastic films therebetween, forms contact areas by pressing thermoplastic films together.

FIG. 3C illustrates an alternative set of contact rollers comprise a punch roll 302 and a press roll 310. The press roll 310 may comprise a conformable surface for conforming to the punch elements, or other surface configuration of the punch roll 302. In still further embodiments, the press roll can comprise a rubber roll. FIG. 3D illustrates yet another implementation of contact rollers comprising two flat rolls.

In any event, one of the rolls may be formed from a relatively hard material (e.g., steel, aluminum, ebonite, or other suitable hard material), and the other may be formed from a softer material (e.g., rubber or other suitable softer material). For example, the punch roll 302 and the cooperating die roll 304 may include a steel-to-rubber interface. In alternative embodiments, both the punch roll 302 and the die roll 304 may be formed from the relatively hard material (e.g., steel). Put another way, the punch roll 302 and the die roll 304 may include a steel-to-steel interface. Regardless of whether the punch roll 302 and the die roll 304 include a steel-to-rubber interface or a steel-to-steel interface, in one or more implementations, one or more of the contact rollers may include an electrically heated roll (e.g., means of heating). For example, in one embodiment, an aluminum punch roll 302 is internally heated by an electric source and a rubber die roll 304 is unheated. Alternatively, in at least one embodiment, at least one of the punch roll 302 and the die roll 304 may be externally heated (e.g., by directing a heat source at one or more outer portions of the roll). In alternative embodiments, neither of the contact rollers are heated.

In one or more implementations, to vary the lamination strength of the contact areas, the heated roller (e.g., the punch roller) is heated differently along the roller. In particular, a higher temperature creates a contact area with a stronger lamination bond. As such, in one or more implementations, the punch elements 308 with a higher temperature will create a contact areas with a greater lamination strength than punch elements 308 with a lower temperature.

In one or more implementations, the temperature of the punch elements 308 varies axially along the punch roll 302. Varying the temperature of the punch elements 308 axially along the punch roll 302 creates contact areas with lamination strengths that vary in the transverse direction. In particular, varying the temperature of the punch elements 308 axially along the punch roll 302 creates contact areas with lamination strengths that vary along the height of the bag (e.g., from the top of the bag towards the bottom of the bag or vice versa).

Additionally, or alternatively, the temperature of the punch elements 308 varies radially along the punch roll 302. Varying the temperature of the punch elements 308 radially along the punch roll 302 creates contact areas with lamination strengths that vary in the machine direction. In particular, varying the temperature of the punch elements 308 radially along the punch roll 302 creates contact areas with lamination strengths that vary along the width of the bag (e.g., from the top of the bag towards the bottom of the bag or vice versa).

In addition to varying the temperature, one or more implementations vary the height of the punch elements 308 to vary the lamination strength of the contact areas. In particular, a greater height of a punch element creates a contact area with a stronger lamination bond due to the increased pressure applied to the films passing through the rollers due to the increased height. As such, in one or more implementations, the punch elements 308 with a greater height will create contact areas with a greater lamination strength than punch elements 308 with a lower height.

In one or more implementations, the height of the punch elements 308 varies axially along the punch roll 302. Varying the height of the punch elements 308 axially along the punch roll 302 creates contact areas with lamination strengths that vary in the transverse direction. In particular, varying the height of the punch elements 308 axially along the punch roll 302 creates contact areas with lamination strengths that vary along the height of the bag (e.g., from the top of the bag towards the bottom of the bag or vice versa).

Additionally, or alternatively, the height of the punch elements 308 varies radially along the punch roll 302. Varying the height of the punch elements 308 radially along the punch roll 302 creates contact areas with lamination strengths that vary in the machine direction. In particular, varying the height of the punch elements 308 radially along the punch roll 302 creates contact areas with lamination strengths that vary along the width of the bag (e.g., from the top of the bag towards the bottom of the bag or vice versa).

The plurality of punch elements may have height of between about 0.010" and about 0.200", and the receiving the die elements may have depth of between about 0.010" and about 0.200". In at least one implementation, as shown in FIG. 3B, the punch elements and the correlating die elements can include a plurality of evenly spaced squares forming a repeat unit. In alternative implementations, the punch elements and the correlating die elements can include a plurality of evenly spaced chevron patterns. Alternatively, the punch elements and the correlating die elements can include a plurality of random polygon shaped protrusions and a plurality of matching random polygon shaped recesses to form a mosaic of random polygon shaped recesses.

In at least one embodiment, one or both of the contact rollers 302, 304 and/or the press roll 310 (as shown in FIGS. 3A-3D above) are heated to a temperature between 125 degrees and 324 degrees (Fahrenheit) in order to create the contact areas 314. Additionally, in at least one embodiment, the contact rollers 302, 304 and/or the press roll 310 may create the contact areas 314 by being positioned so as to create a tooling nip (e.g., a passage) where a multi-film thermoplastic bag passing therein experiences pressure within a range of 100-1800 pounds per square inch. Furthermore, the contact rollers 302, 304 and/or the press roll 310 may create the contact areas 314 by spinning at speeds of 500-1200 feet per minute. In one or more embodiments, the contact rollers 302, 304 and/or the press roll 310 may operate within these ranges of heat, pressure, and speed while processing a two-layer thermoplastic film, a four-layer thermoplastic film, an eight-layer thermoplastic film, or a multi-film thermoplastic bag with even more layers. In at least one embodiment, one or both of the contact rollers 302, 304 and/or the press roll 310 are pre-heated along the outer perimeter of the contact rollers 302, 304 and/or the press roll 310 to a temperature within the range described above. Additionally, or alternatively, the multi-film thermoplastic bag may be pre-heated prior to passing through the contact rollers 302, 304 and/or the press roll 310.

Referring to FIG. 3E, a pattern formed by the contact rollers 302, 304 is illustrated in which each of the contact areas 314 in a flat portion of a portion of a multi-film thermoplastic bag is formed by a cooperating set of punch and die elements, and the remaining unformed areas define the separated areas 316 of the multi-film thermoplastic bag. As mentioned above, and as discussed further below, the contact areas 314 provide a visual impression with significant contrast to the multi-film thermoplastic bag. Additionally, as mentioned above, the contact areas 314 can increase a rigidity of the multi-film thermoplastic bag—thereby creating a sturdier and stronger feel in the areas of the multi-film thermoplastic bag including the contact areas 314.

As shown in FIG. 3E, in one or more implementations, the zone (e.g., the diamond) of contact areas has a uniform pattern of contact areas. In other words, the pattern or configuration of contact areas repeats consistently across the zone of contact areas. While FIG. 3E illustrates a uniform pattern with one size and shape of contact area, alternative implementations include a uniform pattern with different size and/or shapes of contact areas that consistently repeat across the zone.

FIG. 3E illustrates that the zone of contact areas includes three regions 318, 320, 322 that have contact areas with different lamination strengths. In particular, the contact areas in first region 318 have a first lamination strength. The contact areas in the second region 320 have a second lamination strength that is greater than the first lamination strength. The contact areas in the third region 322 have a third lamination strength. The third lamination strength is greater than the second lamination strength.

Figure 4A:
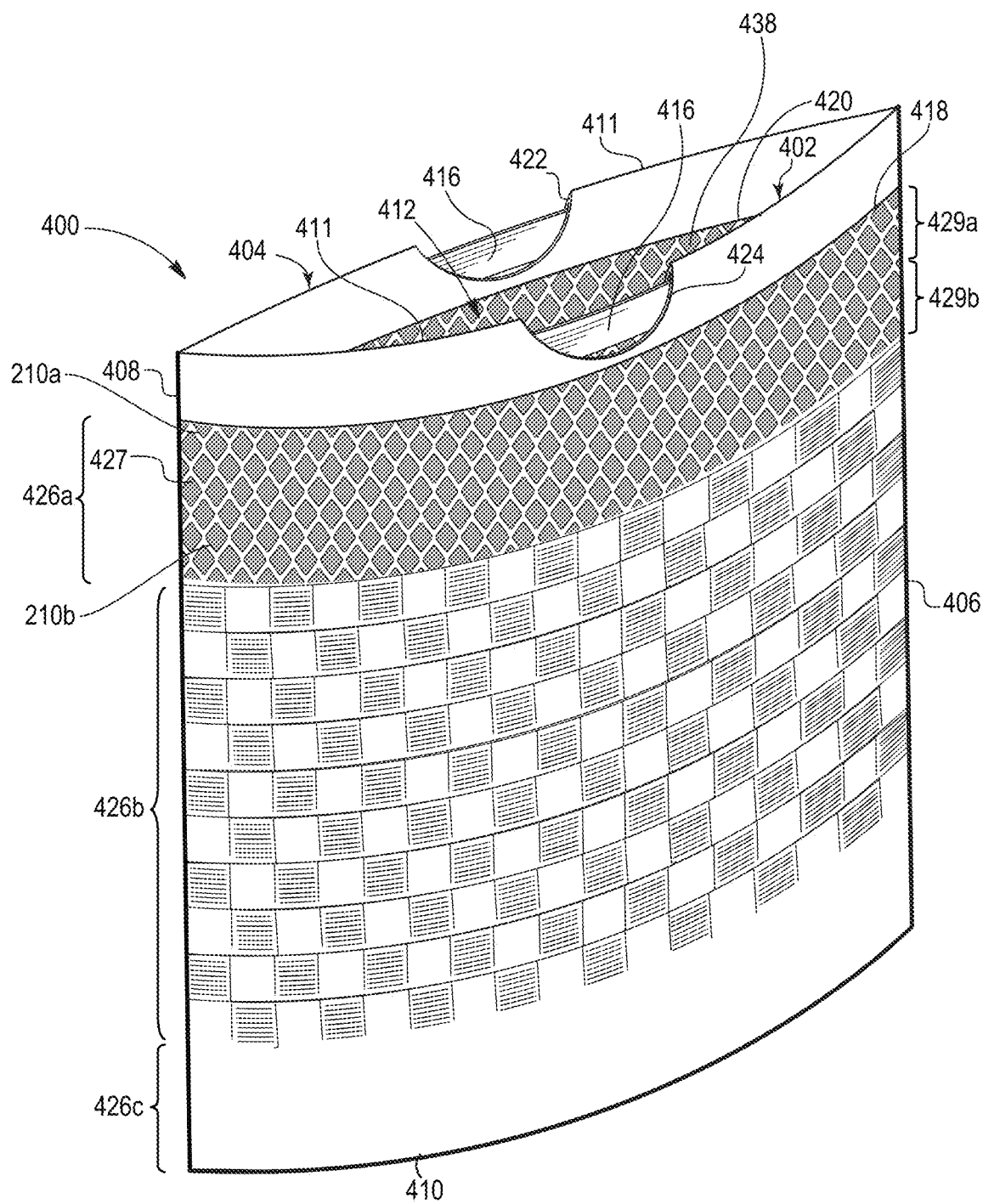
FIG. 4A shows a perspective view of a multi-film thermoplastic bag including a region of contact areas according to one or more implementations of the present disclosure.

FIG. 4A is a perspective view of a multi-film thermoplastic bag 400 according to an implementation of the present disclosure. The multi-film thermoplastic bag 400 includes a first sidewall 402 and a second sidewall 404. Each of the first and second sidewalls 402, 404 includes a first side edge 406, a second opposite side edge 408, a bottom edge 410 extending between the first and second side edges 406, 408. Each of the first and second sidewalls 402, 404 also includes a top edge 411 extending between the first and second side edges 406, 408 opposite the bottom edge 410. In some implementations, the first sidewall 402 and the second sidewall 404 are joined together along the first side edges 406, the second opposite side edges 408, and the bottom edges 410. The first and second sidewalls 402, 404 may be joined along the first and second side edges 406, 408 and bottom edges 410 by any suitable process such as, for example, a heated pressure seal. In alternative implementations, the first and second sidewalls 402, 404 may not be joined along the side edges. Rather, the first and second sidewalls 402, 404 may be a single uniform piece. In other words, the first and second sidewalls 402, 404 may form a sleeve or a balloon structure.

In some implementations, the bottom edge 410 or one or more of the side edges 406, 408 can comprise a fold. In other words, the first and second sidewalls 402, 404 may comprise a single unitary piece of material. The top edges 411 of the first and second sidewalls 402, 404 may define an opening 412 to an interior of the multi-film thermoplastic bag 400. In other words, the opening 412 may be oriented opposite the bottom edge 410 of the multi-film thermoplastic bag 400. Furthermore, when placed in a trash receptacle (e.g., trash can), the top edges 411 of the first and second sidewalls 402, 404 may be folded over the rim of the receptacle.

In some implementations, the multi-film thermoplastic bag 400 may optionally include a closure mechanism located adjacent to the top edges 411 for sealing the top of the multi-film thermoplastic bag 400 to form an at least substantially fully-enclosed container or vessel. As shown in FIG. 4A, in some implementations, the closure mechanism comprises a draw tape 416, a first hem seal 418, and a second hem seal 420. In particular, the first top edge 411 of the first sidewall 402 may be folded over into the interior volume and may be attached or secured to an interior surface of the first sidewall 402 by first hem seal 418. Similarly, the second top edge 411 of the second sidewall 404 is folded over into the interior volume and may be attached to an interior surface of the second sidewall 404 by a second hem seal 420. The draw tape 416 extends through hem channels created by the first and second hem seals 418, 420 along the first and second top edges 411. The hem channel created by the first hem seal 418 includes a first aperture 424 (e.g., notch) extending through the hem channel and exposing a portion of the draw tape 416. Similarly, the hem channel created by the second hem seal 420 includes a second aperture 422 extending through the hem channel and exposing another portion of the draw tape 416. During use, pulling the draw tape 416 through the first and second apertures 422, 424 will cause the top edges 411 to constrict. As a result, pulling the draw tape 416 through the first and second apertures 422, 424 will cause the opening 412 of the multi-film thermoplastic bag 400 to at least partially close or reduce in size. The draw tape closure mechanism may be used with any of the implementations of a multi-film thermoplastic bag described herein.

Although the multi-film thermoplastic bag 400 is described herein as including a draw tape closure mechanism, one of ordinary skill in the art will readily recognize that other closure mechanisms may be implemented into the multi-film thermoplastic bag 400. For example, in some implementations, the closure mechanism may include one or more of flaps, adhesive tapes, a tuck and fold closure, an interlocking closure, a slider closure, a zipper closure, or any other closure structures known to those skilled in the art for closing a bag.

Each of the sidewalls 402, 404 of the multi-film thermoplastic bag 400 comprise a multi-film thermoplastic bag, such as that shown in FIG. 2 above. Thus, each sidewall 402, 404 includes at least an inner layer and an outer layer. Indeed, the thermoplastic bag 400 has a bag-in-bag structure. In other words, the thermoplastic bag 400 includes a first bag and a second bag positioned therein. More particularly, the first thermoplastic bag comprises first and second opposing sidewalls joined together along a first side edge, an opposite second side edge, and a closed first bottom edge. The second thermoplastic bag is positioned within the first thermoplastic bag. The second thermoplastic bag comprises third and fourth opposing sidewalls joined together along a third side edge, an opposite fourth side edge, and a closed second bottom edge. In one or more implementations, the first thermoplastic bag (e.g., the outer layer) is pigmented with a first color, and the second thermoplastic bag is pigmented with a second color (e.g., the inner layer is pigmented with the second color). As described above, the differing colors of the layers can allow for the creation of contact areas when the inner bag and the outer bag are placed into intimate contact.

As shown in FIG. 4A, the multi-film thermoplastic bag 400 includes a first zone 426a, a second zone 426b, and a third zone 426c. In the implementation shown, the first zone 426a includes a pattern 427 of contact areas with varying lamination strength. The pattern 427 of contact areas shown in FIG. 4A includes a medium pattern density and exists on the outer and inner surfaces of the first and second sidewalls 402, 404. Additionally, the first zone 426a covers a portion of the multi-film thermoplastic bag 400 extending from the first hem seal 418 toward the bottom edge 410 of the multi-film thermoplastic bag 400. Additionally, the pattern 427 of contact areas is registered to the same location on the second sidewall 404 of the multi-film thermoplastic bag 400.

The first zone 426a of contact areas includes contact areas of having varying lamination. In particular, the first zone 426a of contact areas includes a first region 429a and a second region 429b. The first region 429a includes a first plurality of contact areas 210a having a first lamination strength. The second region 429b includes a second plurality of contact areas 210b having a second lamination strength. The second lamination strength is greater than the first lamination strength.

In one or more implementations, the second zone 426b includes a pattern of deformations including at least one of raised rib-like elements in a strainable network or alternating thicker ribs and thinner stretched webs (e.g., SELF'ed or ring rolled patterns). For example, as shown in FIG. 4A, the second zone 426b includes a checkerboard pattern of SELF'ed squares as described in International Patent Application No. PCT/US2018/058998 filed on May 16, 202019, nd entitled "THERMOPLASTIC FILMS AND BAGS WITH COMPLEX STRETCH PATTERNS AND METHODS OF MAKING THE SAME," hereby incorporated by reference in its entirety.

As shown by FIG. 4A, the checkboard pattern of deformations can comprise a repeating pattern of raised rib-like elements. In particular, the checkerboard pattern of deformations can include a first plurality of rib-like elements arranged pattern. Portions of the raised rib-like elements of the outer layer can be in direct contact and have the appearance of the inner of the bag 400. In contrast to the pattern 427 of contact areas, however, the portions of deformations (e.g., raised rib-like element of a SELFing pattern or alternating thicker ribs and thinner stretched webs of a ring rolling pattern) stretch the film incrementally to create areas of varying gauge or thickness. The third zone 426c of the multi-film thermoplastic bag 400 is a flat portion of the multi-film thermoplastic bag 400.

In one or more implementations, it is desirable to have more thermoplastic material in areas of the bag 400 (e.g., in the grab zones) that are often susceptible to tears, punctures, rips, or other failures. For example, the first zone 426a lacks significant deformations and is otherwise less stretched relative to the second zone 426b. The additional gauge can reinforce the first zone 426a and help reduce failure. The pattern 427 of contact areas in the first zone 426a provide the region with pleasing aesthetics, and visual and tactile cues of strength and durability without substantially changing the gauge of the films in the first zone 426a.

The thermoplastic bag 400, as shown, includes side heat seals along the side edges 406, 408. As shown, the side heat seals can comprise areas in which all four or more layers of the thermoplastic bag are in intimate contact. As such, the side heat seal (and any other heat seals such as a hem seal) can have the same appearance as the contact areas. Heat seals differ from the contact areas in that the heat seals will not separate prior to failure of the thermoplastic films bonded by the heat seals.

As shown by FIG. 4A, the contact areas in the first zone 426a form a diamond pattern 427 that provides the first zone 426a with a unique visual appearance that connotes strength. Additionally, as mentioned above, the contact areas in the first zone 426a can provide increased stiffness and other tactile cues that connote strength. As such, the contact areas can provide the grab zone with both a look and feel of increased strength.

While FIG. 4A illustrates a pattern 427 of contact areas comprising repeating diamond-shaped elements, other implementations can comprise differently shaped contact areas. For example, the contact areas can comprise squares, circles, ovals, stars, hexagons, or other shapes. As such, the use of diamond-shaped contact areas is for illustrative purpose and does not limit the implementations of the present invention.

Figure 4B:
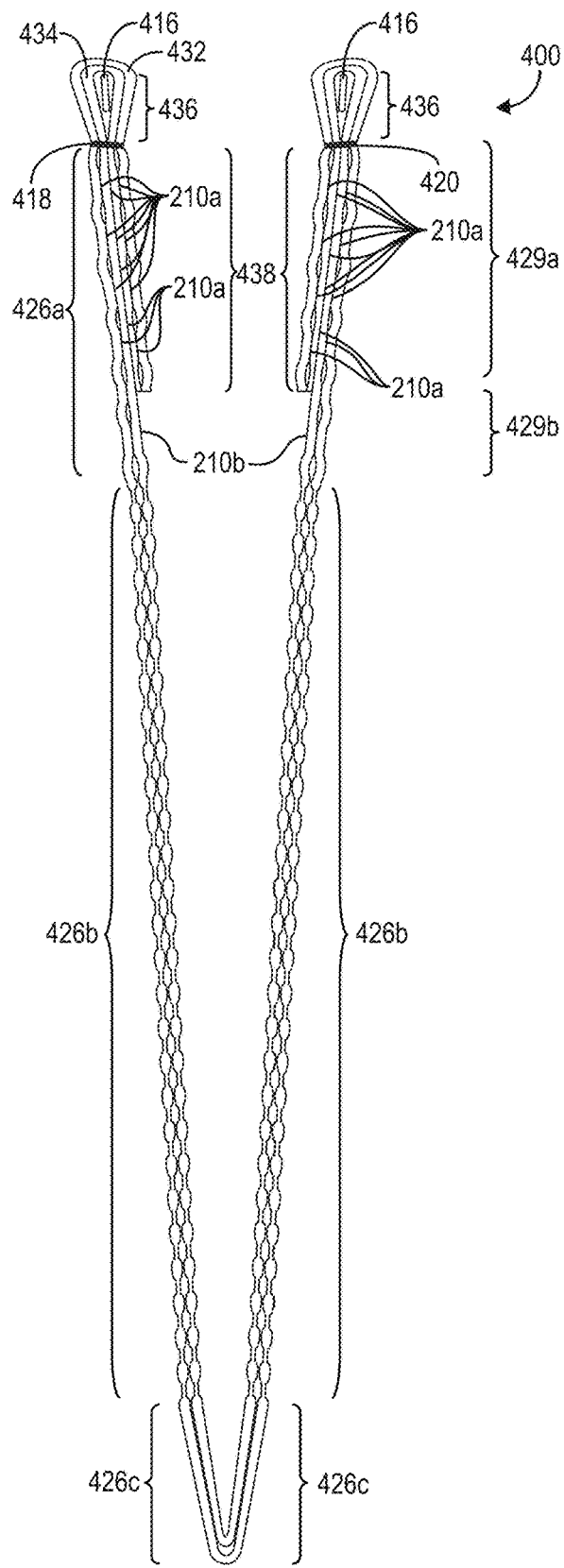
FIGS. 4B-4D illustrate cross-sectional views of the multi-film thermoplastic bag of FIG. 4A according to one or more implementations of the present disclosure.
Figure 4C:
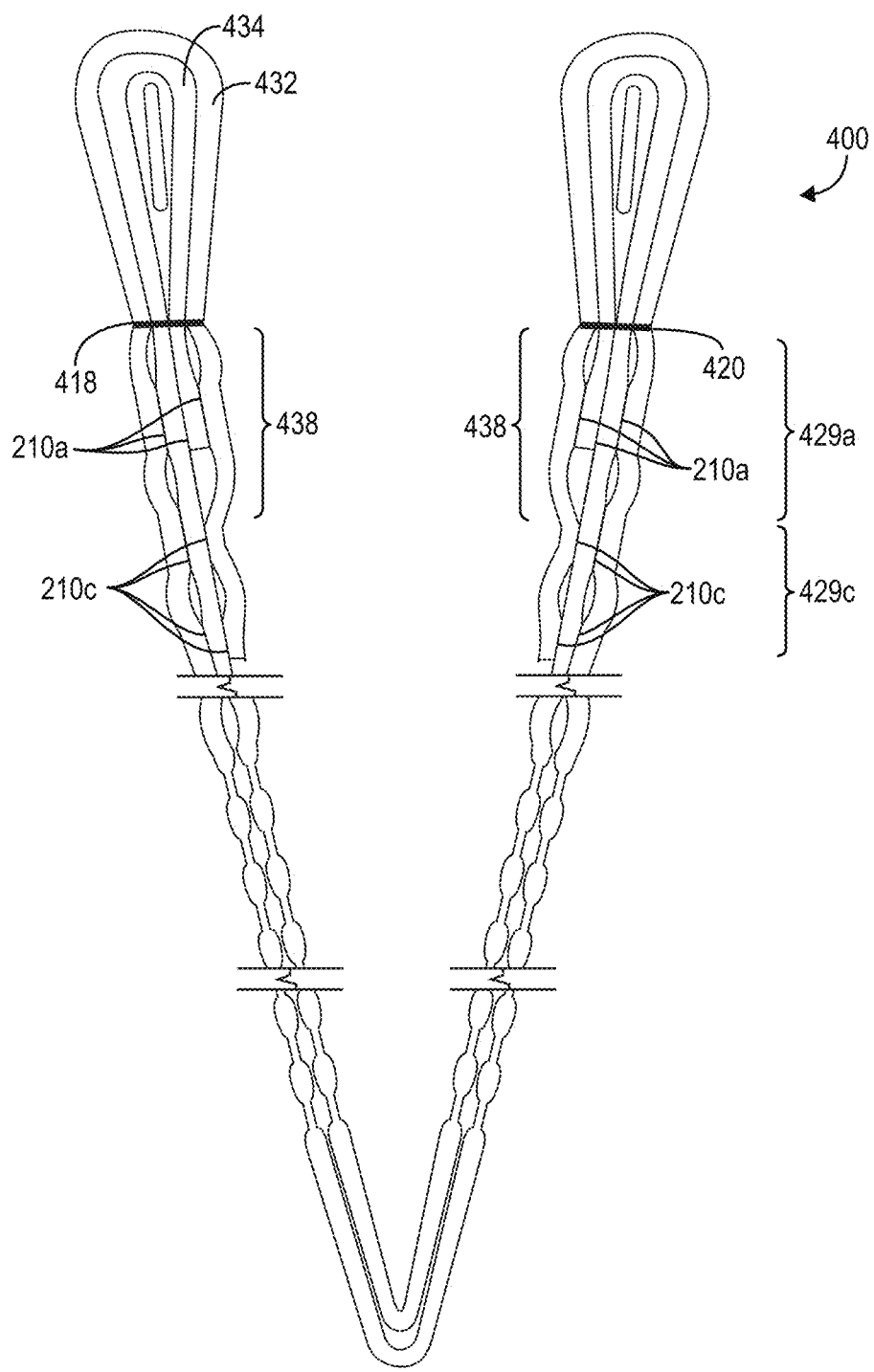
Figure 4D:
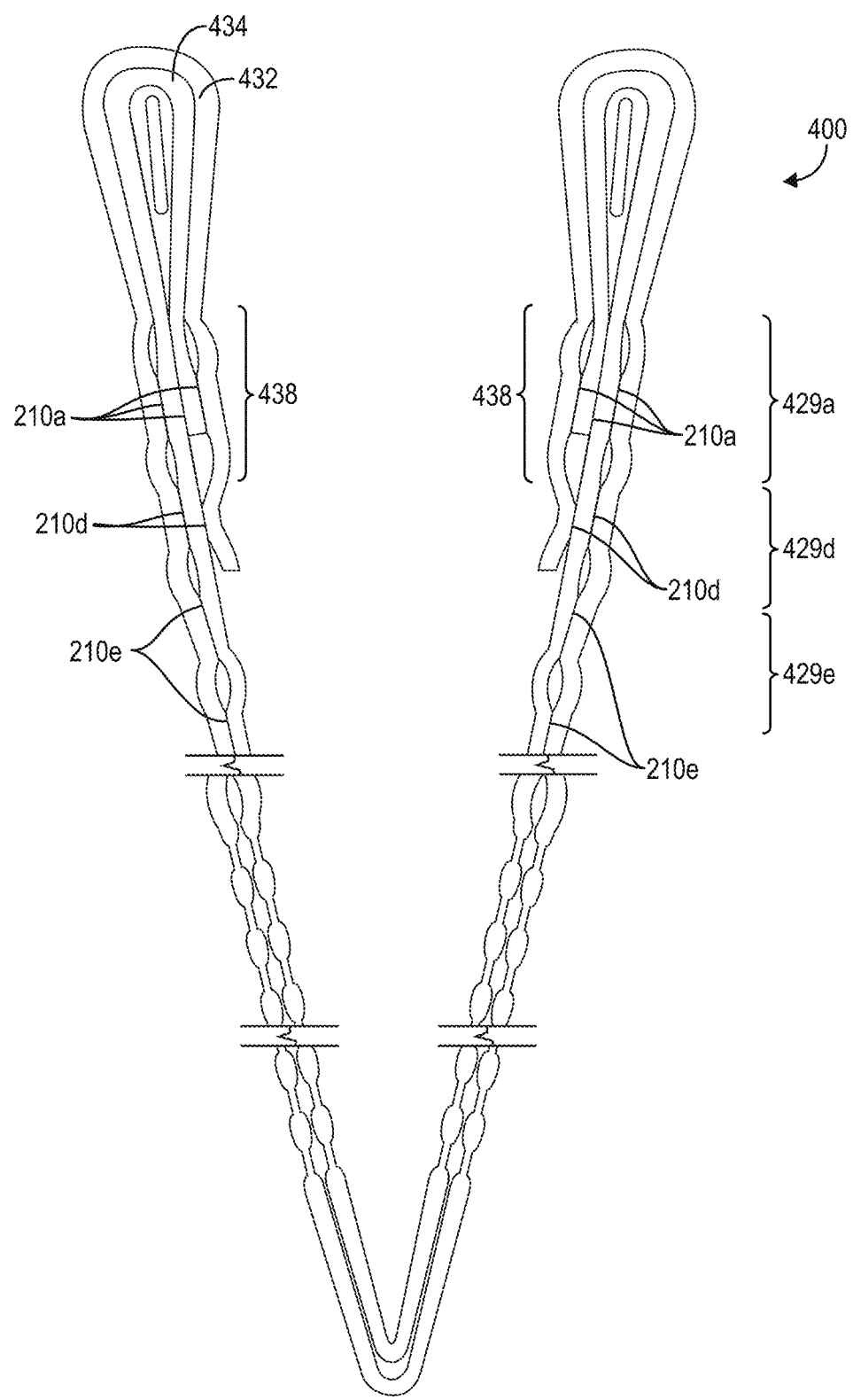

FIGS. 4B-4D illustrate cross-sectional views of one or more implementations of the multi-film thermoplastic bag 400 shown in FIG. 4A. For example, as shown in FIG. 4B, the multi-film thermoplastic bag 400 includes an outer first thermoplastic bag 432 and an inner second thermoplastic bag 434 positioned within the first thermoplastic bag 432. The top edges of the first thermoplastic bag 432 and the second thermoplastic bag 434 are folded over the draw tape 416 to form a hem channel 436. In one or more implementations, the draw tape 416 is movable in the hem channel 436 so as to cinch the multi-film thermoplastic bag 400 closed when pulled through the first and second apertures 422, 424 (e.g., shown in FIG. 4A above). In the embodiment illustrated in FIG. 4B, the hem channel 436 is secured or held in place with by a first hem seal 418 and a second hem seal 420.

As discussed above, the sidewalls of the multi-film thermoplastic bag 400 can include the first zone 426a, the second zone 426b, and the third zone 426c, where each region includes different bonding, or no bonding, between the first thermoplastic bag 432 and the second thermoplastic bag 434. For example, as shown in FIG. 4B, the first zone 426a includes contact areas 210a between the first thermoplastic bag 432 and the second thermoplastic bag 434 where the first thermoplastic bag 432 and the second thermoplastic bag 434 have been brought into intimate contact via any of the processes described above, while leaving the thickness of the bags 432, 434 substantially unchanged in the first zone 426a. As shown, the first region 429a includes a first plurality of contact areas 210a having a first lamination strength. The second region 429b includes a second plurality of contact areas 210b having a second lamination strength. The second lamination strength is greater than the first lamination strength.

The difference in lamination strength can be created by varying the temperature or height of the punch elements of the punch roll used to create the contact areas 210a, 210b as described above. Alternatively, the difference in lamination strength of the contact areas 210a, 210b is created by a difference in the number of films bonded together by the contact areas. Specifically, the greater the number of films bonded together by the contact areas, the lesser the strength of the lamination bonds of the contact areas. Thus, the lesser the number of films bonded together by the contact areas, the greater the strength of the lamination bonds of the contact areas.

As shown by FIG. 4B, the second contact areas 210b bond two films together. The first contact areas 210a bond four films together. Thus, the second contact areas 210b have a greater bond strength than the bond strength of the middle interface of the first contact areas 210a. One will appreciate that the second contact areas 210b of the second region 429b have a greater lamination or bond strength than the middle interface of the first contact areas 210a of the first region 429a despite the first and second contact areas 210a, 210b both being part of a uniform pattern. Indeed, under the same heat and pressure, there is lower lamination "in the middle interface" of a 4-layer stack versus a 2-layer stack.

The second zone 426b includes areas of a plurality of deformations, where the plurality of deformations includes alternating thicker ribs and thinner stretched webs between the first and second bags 432, 434. The third zone 426c includes an area that is flat and undeformed between the first and second bags 432, 434.

As further shown in FIG. 4B, folding over the top edges of the first and second bags 432, 434 creates a hem skirt 438 extending from the hem seals 418, 420 down an inner surface of the second thermoplastic bag 434. As shown, the hem skirt 438 includes portions of the first and second bags 432, 434 that are the same length, where the length (distance from the hem channel toward the bottom of the bag) of the hem skirt 438. The hem skirt 438 may have a length of in a first range of about 0.1 inch (0.254 cm) to about 10 inches (25.4 cm), a second range of about 0.5 inches (1.27 cm) to about 8 inches (20.3 cm), a third range of about 1 inches (2.54 cm) to about 6 inches (15.2 cm), a fourth range of about 3 inches (7.6 cm) to about 6 inches (15.2 cm). In one or more implementations, the hem skirt 438 has a length of 0.5 inches (1.27 cm). In another implementation, the hem skirt 438 has a length of 4 inches (10.2 cm). In one implementation, the hem skirt 438 has a length of 5 inches (12.7 cm). In another implementation, the hem skirt 438 has a length that is shorter or longer than the examples listed above.

The first zone 426a may have a length (distance the first zone extends from the hem channel toward the bottom of the bag) of about 1 inch (2.54 cm) to about 10 inches (25.4 cm), a second range of about 3 inches (7.6 cm) to about 8 inches (20.3 cm), a third range of about 4 inches (10.2 cm) to about 6 inches (15.2 cm), a fourth range of about 3 inches (7.6 cm) to about 6 inches (15.2 cm). In one implementation, the first zone has a length of 5 inches (12.7 cm). In a further implementation, the first zone has a length of 4 inches (10.2 cm). In another implementation, the first zone has a length that is shorter or longer than the examples listed above.

Furthermore, the hem skirt 438 can have a length that is co-extensive or the same length as the first zone 426a. Alternatively, the hem skirt 438 has a length less than a length of the first zone 426a. For example, FIG. 4B illustrates that the hem skirt 438 has a length approximately 66% of the length of the first zone 426a. In alternative implementations, the hem skirt 438 has a length approximately 10%, 20% 25% 33%, 50%, 75%, 80% or 90% of the length of the first zone 426a. In another implementation, the hem skirt 438 has a length that is relatively shorter or longer than the examples listed above compared to the first zone 426a. For example, in one or more implementations, the hem skirt 438 is longer than the first zone 426a.

As further shown in FIG. 4B, the contact areas 210a in the first zone 426a extend through the hem skirt 438. For example, in at least one implementation, the contact areas 210a in the first zone 426a are formed after the top edges of the first and second bags 432, 434 are folded over and secured via the hem seals 418, 420. Thus, the process that forms the contact areas 210 (e.g., via the contact rollers 302, 304 and/or the press roll 310 shown in FIGS. 3A-3D above) also forms contact areas 210a between the first and second bags 432, 434 in the hem skirt 438, and contact areas 210a between the sidewalls of the bag 400 and the hem skirt 438. The contact areas 210a in the hem skirt 438 in combination with the contact areas 210a in the outer portion of the multi-film thermoplastic bag 400 can create rigidity in the multi-film thermoplastic bag 400 in the grab zone that is 0-3 times greater than the rigidity of the multi-film thermoplastic bag 400 in the other regions.

The portions of the first and second bags 432, 434 forming the hem skirts can be the same length or different lengths. For example, in the implementation shown in FIG. 4C, the top edge of the outer first thermoplastic bag 432 extends a greater length in the hem skirt 438 than the top edge of the inner second thermoplastic bag 434. As shown, the top edge of the outer first thermoplastic bag 432 that may extend a first range of about 0.1 inch (0.254 cm) to about 10 inches (25.4 cm) beyond the top edge of the inner second thermoplastic bag 434. In another implementation, the top edge of the outer first thermoplastic bag 432 that may extend a second range of about 0.5 inches (1.27 cm) to about 8 inches (20.3 cm) beyond the top edge of the inner second thermoplastic bag 434. In another implementation, the top edge of the outer first thermoplastic bag 432 that may extend a third range of about 1 inches (2.54 cm) to about 6 inches (15.2 cm) beyond the top edge of the inner second thermoplastic bag 434. In yet another implementation, the top edge of the outer first thermoplastic bag 432 that may extend a fourth range of about 3 inches (7.6 cm) to about 6 inches (15.2 cm) beyond the top edge of the inner second thermoplastic bag 434. In some implementations, the longer edge of the first thermoplastic bag 432 may be unattached from the inner surface of the second thermoplastic bag 434 by contact areas. In other implementations, the longer edge of the first thermoplastic bag 432 may be in contact with the inner surface of the second thermoplastic bag 434 via one or more contact areas, or another type of lamination.

The number of films (e.g., layers) that the contact areas bond together can vary in different implementations. For example, the contact areas in the grab-zone can secure two layers (e.g., the two films of the sidewall), the contact areas in the grab-zone can secure three layers (e.g., the two films of the sidewall and one of the films extending along the inside of the sidewall), or the contact areas in the grab-zone can secure four layers (e.g., the two films of the sidewall and both of the films extending along the inside of the sidewall). The more layers included in the grab-zone bonded by the contact areas, the greater the stiffness and reinforcement.

Specifically, the first zone 426a includes contact areas 210a between the first thermoplastic bag 432 and the second thermoplastic bag 434 where the first thermoplastic bag 432 and the second thermoplastic bag 434 have been brought into intimate contact, while leaving the thickness of the bags 432, 434 substantially unchanged in the first zone 426a. As shown, the first region 429a includes a first plurality of contact areas 210a having a first lamination strength. The first region 492a also includes a second region 429c having a second plurality of contact areas 210c with a second lamination strength. The second lamination strength is greater than the first lamination strength at the middle interface.

The difference in lamination strength can be created by varying the temperature or height of the punch elements of the punch roll used to create the contact areas 210a, 210c as described above. Additionally, the difference in lamination strength of the contact areas 210a, 210c is created by a difference in the number of films bonded together by the contact areas. Specifically, as shown by FIG. 4C, the second contact areas 210c bond three films together. The first contact areas 210a bond four films together. Thus, the second contact areas 210c have a greater bond strength than the bond strength of the middle interface of the first contact areas 210a. One will appreciate that the second contact areas 210c of the second region 429c have a greater lamination or bond strength than the middle interface of the first contact areas 210a of the first region 429a despite the first and second contact areas 210a, 210b both being part of a uniform pattern.

In yet another implementation, the top edge of the inner second thermoplastic bag 434 may extend beyond the top edge of the outer first thermoplastic bag 432. For example, the top edge of the inner second thermoplastic bag 434 may extend any distance beyond the top edge of the outer first thermoplastic bag 432. In another implementation, the hem skirt 438 may only include either the top edge of the outer first thermoplastic bag 432 or the top edge of the inner second thermoplastic bag 434. In that implementation the hem skirt 438 may include contact areas 210 between either the top edge of the outer first thermoplastic bag 432 or the top edge of the inner second thermoplastic bag 434 and the inner surface of the inner second thermoplastic bag 434. Accordingly, the contact areas 210 can be between two, three, or four layers of the multi-film thermoplastic bag 400.

As discussed above, the multi-film thermoplastic bag 400 can include first and second hem seals 418, 420 securing the hem channel 436. In other implementations, the multi-film thermoplastic bag 400 may be devoid of one or more of the first and second hem seals 418, 420. For example, in the implementation shown in FIG. 4D, the multi-film thermoplastic bag 400 is devoid of the first and second hem seals 418, 420. Instead, the multi-film thermoplastic bag 400 shown in FIG. 4D includes the contact areas 210a, 210b, 210d in the first zone 426a extending from the hem channel 436 toward the bottom of the multi-film thermoplastic bag 400. Moreover, the multi-film thermoplastic bag 400 includes the hem skirt 438 extending from the hem channel 436 down the inner surface of the second thermoplastic bag 434. In the implementation illustrated in FIG. 4D, the contact areas 210a, 210b, 210d in the first zone 426a that extend through the hem skirt 438 can secure the hem channel 436 in the absence of a hem seal.

Like the other embodiments, the first zone 426a includes contact areas having variable lamination strengths. Specifically, the first zone 426a includes contact areas 210a between the first thermoplastic bag 432 and the second thermoplastic bag 434 where the first thermoplastic bag 432 and the second thermoplastic bag 434 have been brought into intimate contact, while leaving the thickness of the bags 432, 434 substantially unchanged in the first zone 426a. As shown, the first region 429a includes a first plurality of contact areas 210a having a first lamination strength. The first zone 426a also includes a second region 429d that includes a second plurality of contact areas 210d having a second lamination strength. The second lamination strength is greater than the first lamination strength in the middle interface. The first zone 426a also includes a third region 429e that includes a third plurality of contact areas 210e having a third lamination strength. The third lamination strength is greater than the second lamination strength.

The difference in lamination strength can be created by varying the temperature or height of the punch elements of the punch roll used to create the contact areas 210a, 210d, 210e as described above. Additionally, the difference in lamination strength of the contact areas 210a, 210d, 210e is created by a difference in the number of films bonded together by the contact areas. Specifically, as shown by FIG. 4D, the first contact areas 210a bond four films together. The second contact areas 210d bond three films together and the third contact areas 210e bond two films together. Thus, the third contact areas 210e have a greater bond strength than the bond strength of the second contact areas 210d, which in turn have a greater bond strength than the middle interface of the first contact areas 210a.

The increased lamination strength of the contact areas at the bottom edge of the hem skirt 438 as shown in FIGS. 4C and 4D helps to ensure that the hem skirt 438 does not delaminate from the inside of the bag 400. Thus, the increased lamination strength of the contact areas at the bottom edge of the hem skirt 438 can help ensure that the first zone 426a is reinforced by the layers of the hem skirt 438.

Figure 5:
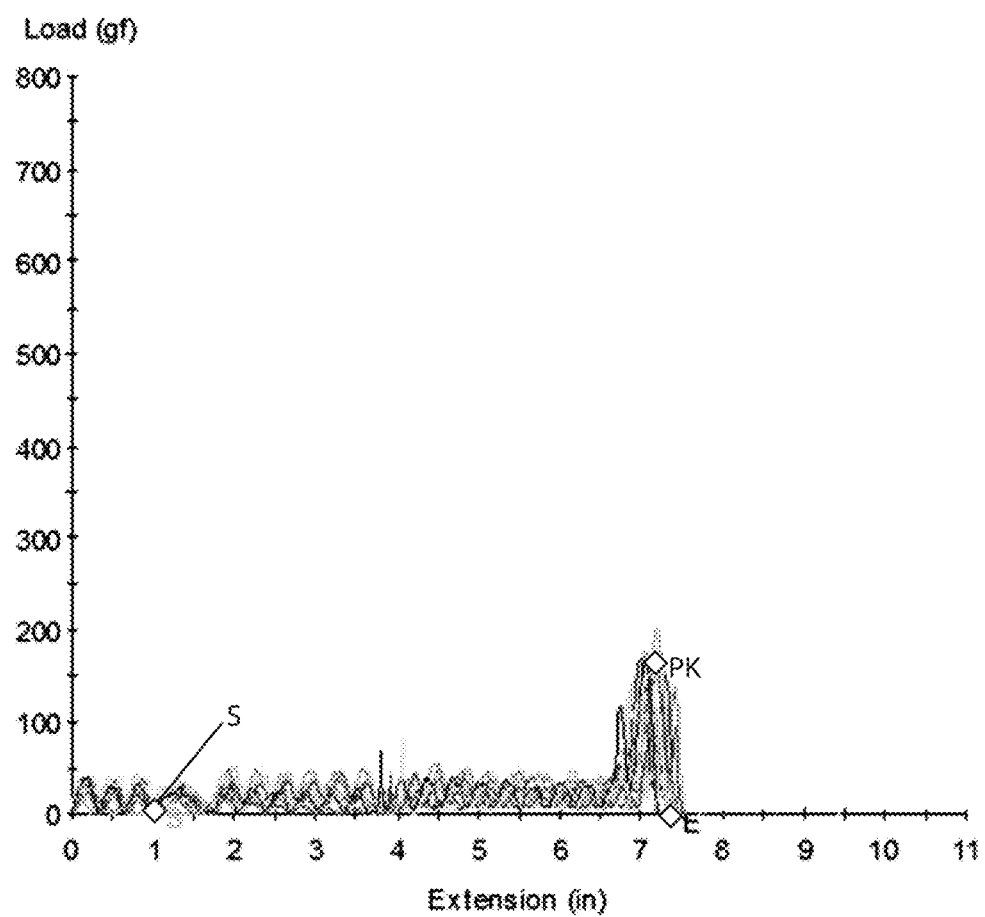
FIG. 5 is a graph showing the effect of the number of films being secured together by contact areas on the lamination strength of the contact areas according to one or more implementations of the present disclosure.

As mentioned above, having differing numbers of films being secured together by contact areas can alter the lamination strength of the contact areas even though the contact areas are formed by the same heat and pressure and are part of the same uniform pattern. For example, FIG. 5 illustrates a graph of showing the lamination strength of a bag with a configuration of that shown in FIG. 4C. Specifically, the graph of FIG. 5 shows the lamination strength of the contact areas as measured by a 180-degree T Peel method. The x-axis is the distance from the bag hem fold to the bottom of the hem skirt. The y-axis shows the lamination strength in gram-force. At approximately 6.75 inches from the bag hem fold, the hem skirt transitions from four films being bonded together by contact areas to three films being bonded together by contact areas. As shown, the area of the portion of the zone of contact areas bonding three layers together has a higher lamination strength than the portion of the zone of contact areas bonding four layers together. This shows that by reducing the number of films bonded together at the end of the hem skirt can provide an edge sealing effect to help ensure that the hem skirt does not de-laminate from the inner sidewall of the bag inadvertently. As shown by FIG. 5, a second lamination strength of the contact areas bonding three layers together can be approximately 3 to 4 times greater than a first lamination strength of the contact areas bonding four layers together.

Figure 6:
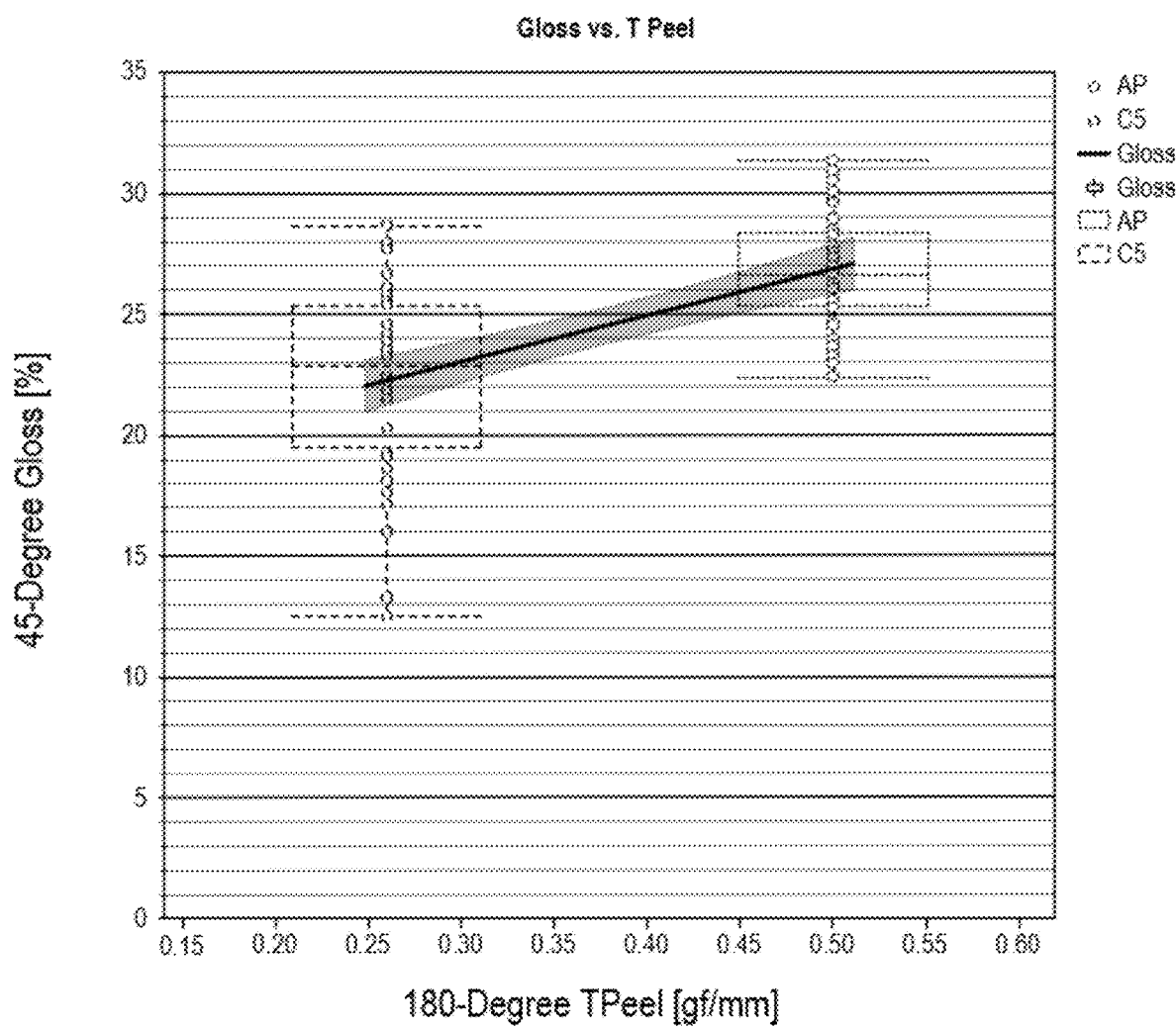
FIG. 6 is a graph showing the effect of the gloss of films being secured together by contact areas on the lamination strength of the contact areas according to one or more implementations of the present disclosure.

In addition to the processing conditions and the number of films being secured together, one or more implementations include tailoring a lamination strength of contact areas by controlling material composition or material properties. For example, one or more implementations include having a zone having a material composition that results in a lamination change under the same processing conditions. Specifically, a zone of the bag can include a resin blend that seals more easily that the resin blends in other zones of the bag. Additionally, one or more implementations include altering the surface roughness or gloss of a film to cause a change in lamination strength of contact areas. For example, FIG. 6 illustrates a graph showing the effect of gloss on lamination strength of contact areas. As shown by FIG. 6, the greater the gloss the greater the lamination strength.

Figure 7:
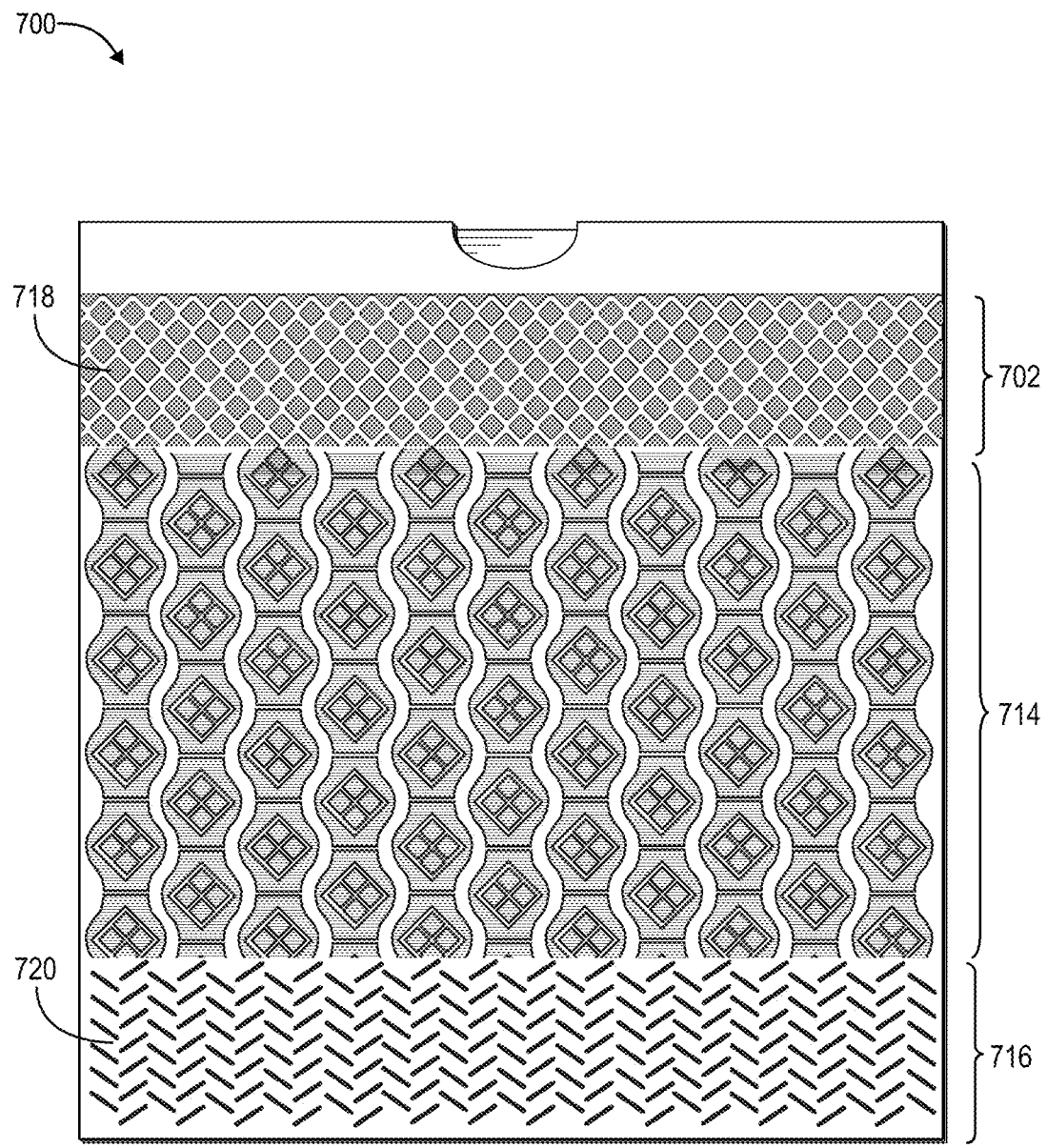
FIG. 7 shows a front view of multi-film thermoplastic bags including regions of contact areas according to one or more implementations of the present disclosure.

In one or more implementations, one or more contact areas can be positioned in various portions of a multi-film thermoplastic bag. FIG. 7 illustrates an implementations of a multi-film thermoplastic bag with various configurations of contact areas. In one or more implementations, the multi-film thermoplastic bag 700 can include multiple areas of contact areas in various patterns. For example, FIG. 7 shows a multi-film thermoplastic bag 700 with a first zone 702 of contact areas, a second zone 714 of SELFing, and a third zone 716 of contact areas. As shown the pattern of contact areas 718 of the first zone 702 of contact areas has a higher density of contact areas compared to the pattern of contact areas 720 of the third zone of contact areas. The increased density of contact areas can provide the first zone 702 with a greater lamination strength than the third zone 716 of contact areas.

Although FIGS. 4A-7 show regions of contact areas in various configurations, additional configurations of contact areas are possible. For example, multi-film thermoplastic bag can include a single continuous region of contact areas (e.g., extending from the top of the multi-film thermoplastic bag to the bottom of the multi-film thermoplastic bag). In another implementation, a multi-film thermoplastic bag can include multiple strips of contact areas spaced by flat, undeformed regions. In other implementations, a multi-film thermoplastic bag can include regions and/or grab zones of contact areas in any configuration.

Figure 8:
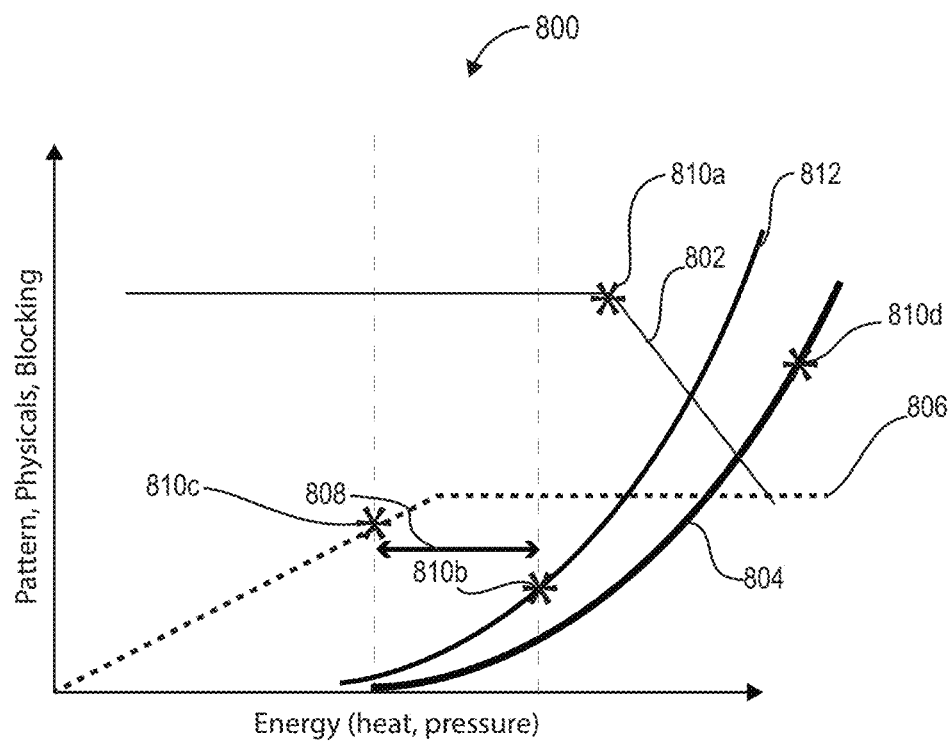
FIG. 8 shows a chart illustrating levels of heat and pressure applied during the contact area creation process according to one or more implementations of the present disclosure.

As mentioned above, in at least one implementation, the contact areas between portions of thermoplastic film layers of a multi-film thermoplastic bag are formed passing through contact rollers in a process that includes applying heat and pressure to the portions of thermoplastic film layers. FIG. 8 includes a chart 800 illustrating an optimal amount of heat and pressure applied during the heat embossing process that results in preferred quality measures (e.g., visual or pattern, physicals, blocking, and holes) of the resulting multi-film thermoplastic bag.

For example, as shown in FIG. 8, as heat and pressure increase, the physical properties of a multi-film thermoplastic bag indicated by the curve 802 remain the same until a drop off point 810a (e.g., yield point). After the drop off point 810a, the continued increase of heat and pressure cause the physical properties of the multi-film thermoplastic bag to deteriorate rapidly. As used herein, the "physical properties," "physical parameters," or "physicals" of a multi-film thermoplastic bag refer to the molecular strength of the multi-film thermoplastic bag. In particular, the physicals indicated by curve 802 can comprise transverse direction tensile strength, transverse or machine direction tear resistance, or puncture resistance (e.g., as measured by a dart drop test).

As further shown in FIG. 8, as heat and pressure increase in the process, the blocking of the multi-film thermoplastic bag indicated by the curve 812 increases in approximately an exponential manner. As used herein, "blocking" refers to the level with which a thermoplastic film sticks to itself. As indicated by the point 810b on the curve 812, there is an amount of heat and pressure beyond which the amount of blocking exhibited by a multi-film thermoplastic bag is undesirable. For example, a high level of blocking can cause the multi-film thermoplastic bag to self-stick in such a way that it is unusable for the processes described herein. In particular, by at least point 810b the films are sealed together in a manner that they cannot be separated without causing the individual layers to fail.

Moreover, as shown in FIG. 8, as heat and pressure increase in the heat embossing process, the aesthetic value (e.g., the visibility as measured by ΔE) of the pattern of heated pressure seals formed by the heat embossing process increases, as indicated by the curve 806. For example, as indicated by the point 810c, an increasing amount of heat and pressure during the heat embossing process causes the aesthetic value of the pattern of contact areas pressed into the multi-film thermoplastic bag to increase to a desirable level. Below this critical level of energy at 810c, the aesthetic value may result in a pattern of contact areas that is difficult to recognize, unnuanced, or otherwise undesirable.

In one or more implementations, increasing heat and pressure during the heat embossing process also increases a flexural rigidity (or stiffness) of the multi-film thermoplastic bag. For example, flexural rigidity refers to a measure of flexibility or rigidity of the multi-film thermoplastic bag. In at least one implementation, the flexural rigidity of the multi-film thermoplastic bag increases in a linearly proportional manner as heat and pressure increase in the contact area formation process until a point where the rigidity plateaus. An increased amount of flexural rigidity in the multi-film thermoplastic bag is desirable as it creates an increased perception of strength and quality of the multi-film thermoplastic bag where the contact areas are incorporated. In one or more implementations, the contact areas can increase the flexural rigidity [microjoule/m] from 1.1 times to 5 times compared to a flat/undeformed film of the same gauge. More particularly, in one or more implementations, the contact areas can increase the flexural rigidity from 1.5 times to 4 times, or 1.5 times to 3 times, or 2 times to 4 times compared to a flat/undeformed film of the same gauge.

Flexural rigidity of the multi-film thermoplastic bag can be measured according to a cantilever test and/or a heart loop test as described in ASTM standard D1388-18. For example, the cantilever test measures flexural rigidity by sliding a strip of the multi-film thermoplastic bag at a specified rate in a direction parallel to its long dimension, until a leading edge of the strip projects from the edge of a horizontal surface. The length of the overhang of the strip is measured when the end of the strip is depressed under its own mass to the point where end of the strip droops by at least a 41.5 degree angle from the horizontal. The flexural rigidity of the multi-film thermoplastic bag is determined based on the length of the overhang. The heart loop test measures flexural rigidity by forming a strip of the multi-film thermoplastic bag into a heart-shaped loop. The length of the loop is measured when it is hanging vertically under its own mass. The flexural rigidity of the multi-film thermoplastic bag is determined based on the length of the loop. Additionally, as shown in FIG. 8, increasing heat and pressure can cause a creation of holes (e.g., micro pores or larger holes) within a multi-film thermoplastic bag. As illustrated, it is possible for the process to create holes in the multi-film thermoplastic bag prior to any significant loss of other physicals (e.g., the molecular strength of the multi-film thermoplastic bag). For example, an amount of heat and pressure beyond the point 810*d* can cause holes to form within one or more layers of the multi-film thermoplastic bag. Holes within the multi-film thermoplastic bag are generally undesirable as they may make the multi-film thermoplastic bag unfit for its intended purpose (e.g., lead to leaks in a trash bag).

Thus, as shown by the arrow 808 in the chart 800, there is a range of heat and pressure that can be applied during the contact area creation process that results in optimized levels for physicals, blocking, pattern (i.e., visual), flexural rigidity, and holes. In one or more implementations, this range includes heating at least one contact roller to a range of 125-325 degrees Fahrenheit. Furthermore, the range includes pressure in the tooling nip at a range of 100-1800 pounds per square inch. Moreover, in at least one implementation, the range also includes speeds of the contact rollers at a range of 500-1200 feet per minute. In alternative implementations, the preferred range may include heats, pressures, or speeds at other ranges.

When operated within the ranges of heat and pressure indicated by the arrow 808 in the chart 800, the contact areas creation process described herein produces contact areas with optimized qualities. For example, in at least one embodiment, a contact area created by the process operating within the optimal heat and pressure ranges exhibits a pattern where the Delta E of the pattern versus separated areas of the films is 0.3 to 50 points higher and more specifically 1.0 to 10.3 points higher. For example, Delta E can refer to the visibility of the contact area and can include one or more of a change in L luminance value associated with the contact area, a change in a-measure of red/green lightness/darkness associated with the contact area, or a change in a b-measure of blue/yellow lightness/darkness associated with the contact area. In one or more implementations, a contact area created by the process operating within the optimal heat and pressure range indicated by the arrow 808 exhibits a pattern where the Delta E of the pattern versus adjacent separated areas of film is 3.1 points higher on average.

Similarly, in at least one embodiment, a contact area created by the process operating within the optimal heat and pressure range indicated by the arrow 808 exhibits physicals where the peak load ratio of the areas including the contact area is between 38% and 100% of the TD tensile strength the films prior to formation of the contact area when measured on a one-inch TD tensile pull test. More specifically the contact area is between 54% and 100% of the TD tensile strength the films prior to formation of the contact area. In one or more implementations, a contact area created by the process operating within the optimal heat and pressure range indicated by the arrow 808 exhibits physicals where the peak load ratio of the contact area is 92% of the TD tensile strength of the pre-processed film. In at least one embodiment, the contact area created by the process operating within the optimal heat and pressure range indicated by the arrow 808 can also exhibit desired levels of puncture resistance and tear values (in the machine and/or transverse direction).

Moreover, in at least one embodiment, a contact area created by the process operating within the optimal heat and pressure range indicated by the arrow 808 exhibits blocking where the peel strength [g/mm] is between 0.00 and 5.20, between 0.00 and 2.60, between 0.00 and 1.70, or between 0.00 and 0.88 when peel forces are exerted on a three-inch T peel between inner bag layers. Specifically, a contact area created by the process operating with the optimal heat and pressure ranges exhibits blocking where the peel strength [g/mm] is 0.29 when peel forces are exerted on a three-inch T peel between inner bag layers. Additionally, in at least one implementation, the contact areas are configured to separate before any layer of the multi-film film or bag fails when subjected to peel forces.

Additionally, as shown in FIG. 8, a contact area created by the process operating within the optimal heat and pressure range indicated by the arrow 808 also exhibits minimal holes. For example, in at least one embodiment, holes may be identified by inflating the multi-film thermoplastic bag including the contact area and checking for light show-through. Holes and blocking associated with multi-film thermoplastic bag may be minimized while maximizing visual and physicals by operating the process within the heat and pressure range indicated by the arrow 808.

Figure 9:
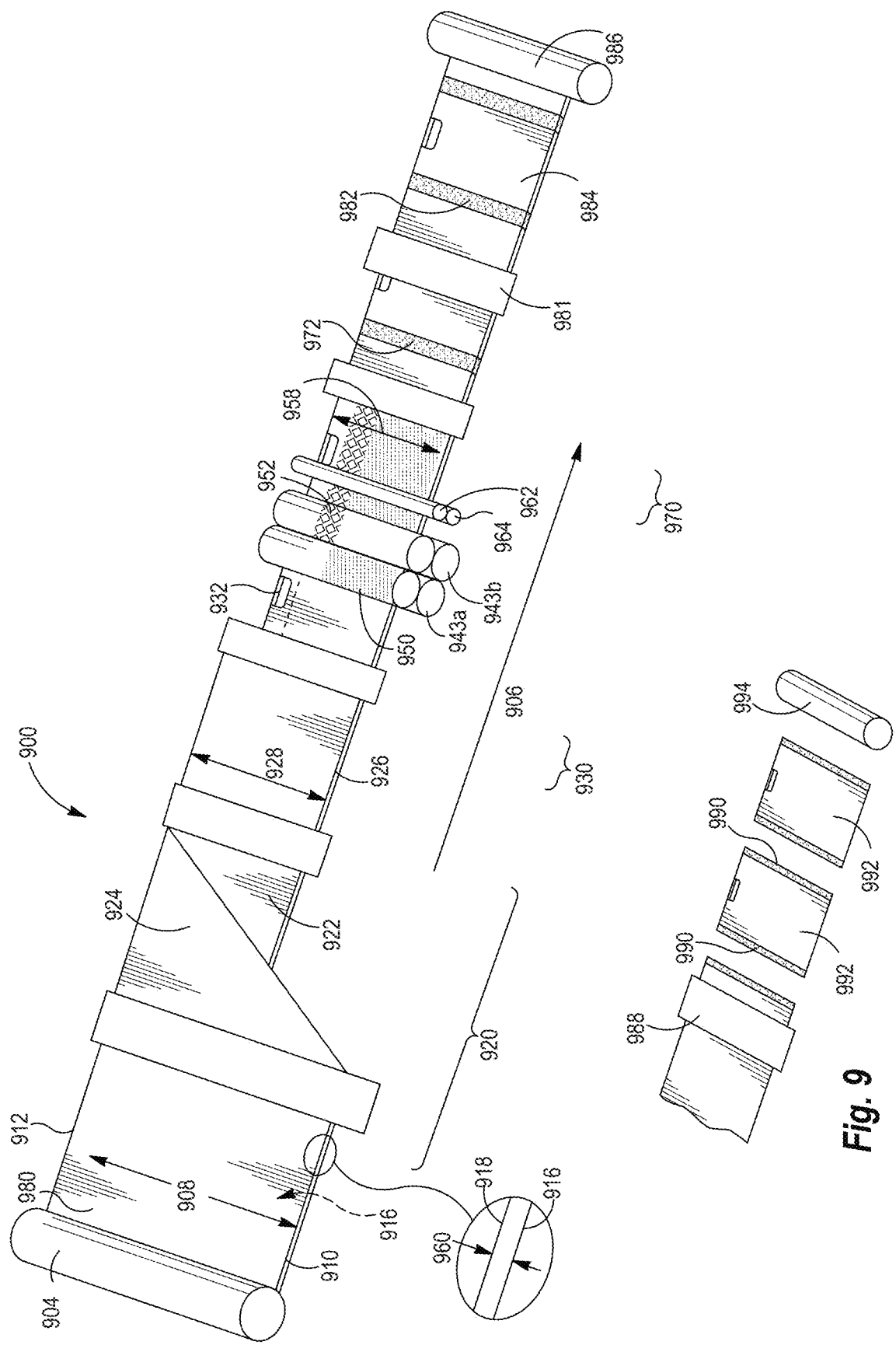
FIG. 9 illustrates a schematic diagram of a process of manufacturing a multi-film thermoplastic bag with contact areas in accordance with one or more implementations of the present disclosure.

To produce a bag having one or more contact areas as described, continuous webs of thermoplastic material may be processed through a high-speed manufacturing environment such as that illustrated in FIG. 9. In the illustrated process 900, production may begin by unwinding a first continuous web or film 980 of thermoplastic sheet material from a roll 904 and advancing the web along a machine direction 906. The unwound web 980 may have a width 908 that may be perpendicular to the machine direction 906, as measured between a first edge 910 and an opposite second edge 912. The unwound web 980 may have an initial average thickness 960 measured between a first surface 916 and a second surface 918. In other manufacturing environments, the web 980 may be provided in other forms or even extruded directly from a thermoplastic forming process.

Figure 10:
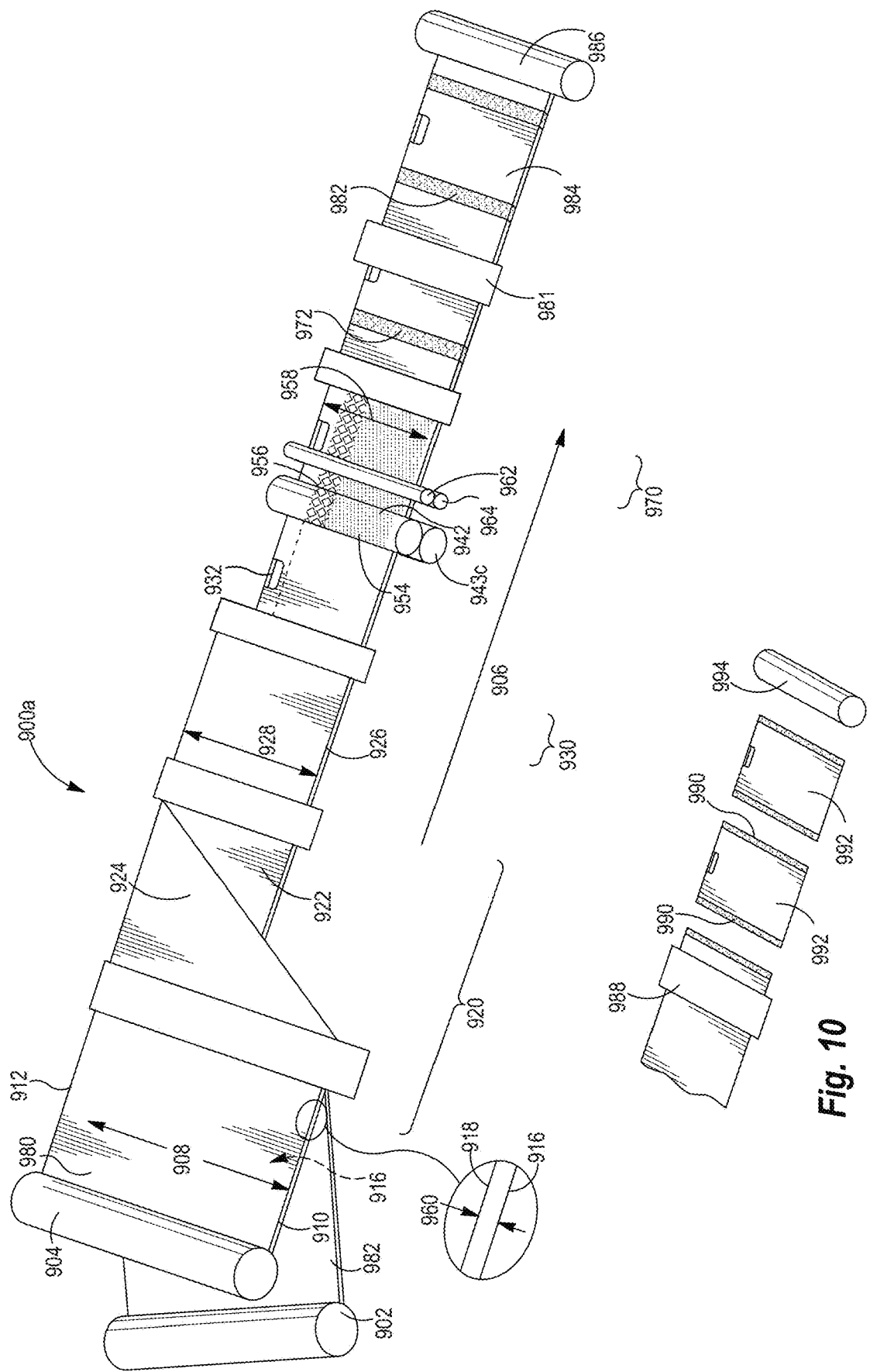
FIG. 10 illustrates a schematic diagram of another process of manufacturing a multi-film thermoplastic bag with contact areas in accordance with one or more implementations of the present disclosure.

In some implementations, as shown in FIG. 10, the illustrated process 900*a* involves unwinding a second continuous web or film 982 of thermoplastic sheet material from a roll 902 and advancing the web along a machine direction 906. The second film 982 can comprise a thermoplastic material, a width, and/or a thickness that is similar or the same as the first film 980. In alternative one or more implementations, one or more of the thermoplastic material, width, and/or thickness of the second film 982 can differ from that of the first film 980. To provide the first and second sidewalls of the finished bag, the films 980, 982 may be folded into a first half 922 and an opposing second half 924 about the machine direction 906 by a folding operation 920. When so folded, the first edge 910 may be moved adjacent to the second edge 912 of the web. Accordingly, the width of the films 980, 982 proceeding in the machine direction 906 after the folding operation 920 may be a width 928 that may be half the initial width 908. As may be appreciated, the portion mid-width of the unwound films 980, 982 may become the outer edge of the folded films 980, 982. In any event, a hem channel may be formed by folding adjacent first and second edges 910, 912 over (e.g., at a top edge) and a draw tape 932 may be inserted into the hem channel during a hem channel and draw tape operation 930. In some implementations, as shown in FIGS. 9 and 10, the hem channel and draw tape operation 930 may fold over a length of the first and second edges 910, 912 such that a hem skirt is formed (e.g., indicated by the dashed line following the operation 930) down an inner surface of the multi-film thermoplastic bag.

To form one or more regions of contact areas in a multi-film thermoplastic bag, the processing equipment may include at least one set of contact rollers 943b where at least one of the rolls is heated, such as those described herein above. Referring to FIG. 9, the folded web 980 may be advanced along the machine direction 906 between intermeshing rollers 943a (e.g., ring rolls, SELFing rollers, or embossing rollers), which impart a pattern 950 of elements in one portion, zone, area, or section of the resulting multi-film thermoplastic bag.

The folded web 980 may then advance through the contact rollers 943b, which impart a pattern 952 of contact areas to the resulting multi-film thermoplastic bag. In one or more implementations, passing the folded web 980 between the set of heated contact rollers 943b creates one or more contact areas between flat portions of the folded web 980 and the hem skirt (e.g., indicated by the dashed line). For example, the one or more contact areas can extend from the hem channel over the hem skirt toward the bottom edge of the folded web 980. As shown in FIG. 9, the pattern 950 of the intermeshing rollers 943a may be offset from the pattern 952 of the contact rollers 943b, such that the patterns imparted to the resulting multi-film thermoplastic bag do not overlap, or partially overlap depending on the offset.

As mentioned above, in one or more implementations, one of the contact rollers 943b is heated (e.g., a metal contact roller) while other contact roller is unheated (e.g., a rubber contact roller). In such implementations, having heat being applied to the one side of the films 980, 982 can cause the contact areas on that heated side be more visually distinct (e.g., darker) and/or have more blocking between the layers on the headed side. Additionally, or alternatively, both of the rollers 943a, 943b may be heated rollers. For example, each of the rollers 943a, 943b may include a rubber roller (e.g., as a top or bottom roller) and a patterned roller. As explained above, to vary the lamination strength of the contact zones, the patterned roller can have variable heating or punch elements of variables heights. Alternatively, or additionally, the number of film layers, the film material compositions, the film material properties, and/or the density of contact areas are controlled to vary the lamination strength of the contact areas.

In at least one embodiment, the processing equipment may include a vision system or sensor system in connection with one or more of the intermeshing rollers 943a and the contact rollers 943b. For example, the vision system or sensor system may detect pattern presence, placements, and darkness. Similarly, the sensor system may detect the TD placement of the film (e.g., similar to web breakout or guiding systems). Additionally, the processing equipment may include a force gauge probe to measure the drag of the film across the gauge between inner layers.

To avert imparting a pattern (e.g., of contact areas or otherwise) onto the portion of the web that includes the draw tape 932, the corresponding ends of the rollers 943a, 943b may be smooth and without ridges, grooves, punch elements, or die elements. Thus, the adjacent edges 910, 912 and the corresponding portion of the web proximate those edges that pass between the smooth ends of the rollers 943a, 943b may not be imparted with any pattern. In alternative implementations, the intermeshing rollers (if present) and the contact rollers are positioned prior to the drawtape insertion process.

The processing equipment may include pinch rollers 962, 964 to accommodate the width 958 of the web 980. In one or more implementations, the nip rollers can be modified into contact rollers to produce contact areas. For example, in implementations with continuous contact areas, at least one of the pinch rollers 962, 964 can be heated and act as contact rollers.

In one more implementations, the heat and pressure of the contact rollers can ensure that there is little to no bonding between the folded halves 922, 924 to ensure that the bag 984 can be opened.

To produce the finished bag, the processing equipment may further process the folded web with at least one region of contact areas. For example, to form the parallel side edges of the finished multi-film thermoplastic bag, the web may proceed through a sealing operation 970 in which heat seals 972 may be formed between the folded edge 926 and the adjacent edges 910, 912. The heat seals may fuse together the adjacent halves 922, 924 of the folded web. The heat seals 972 may be spaced apart along the folded web and in conjunction with the folded outer edge 926 may define individual bags. The heat seals may be made with a heating device, such as, a heated knife A perforating operation 981 may perforate the heat seals 972 with a perforating device, such as, a perforating knife so that individual bags 992 may be separated from the web. In one or more implementations, the webs may be folded one or more times before the folded webs may be directed through the perforating operation. The web 980 embodying the bags 984 may be wound into a roll 986 for packaging and distribution. For example, the roll 986 may be placed in a box or a bag for sale to a customer.

In one or more implementations of the process, a cutting operation 988 may replace the perforating operation 980. The web is directed through a cutting operation 988 which cuts the webs at location 990 into individual bags 992 prior to winding onto a roll 994 for packaging and distribution. For example, the roll 994 may be placed in a box or bag for sale to a customer. The bags may be interleaved prior to winding into the roll 994. In one or more implementations, the web may be folded one or more times before the folded web is cut into individual bags 992. In one or more implementations, the bags 992 may be positioned in a box or bag, and not onto the roll 994.

FIG. 10 illustrates a modified high-speed manufacturing 900a that involves unwinding a second continuous web or film 982 of thermoplastic sheet material from a roll 902 and advancing the web along a machine direction 906. The second film 982 can comprise a thermoplastic material, a width, and/or a thickness that is similar or the same as the first film 980. In alternative one or more implementations, one or more of the thermoplastic material, width, and/or thickness of the second film 982 can differ from that of the first film 980. The films 980, 982 can be folded together during the folding operation 920 such that they pass through the contact rollers 943c to form one or more regions of deformations and regions of contact areas in the resulting multi-filmed thermoplastic bags.

As shown by FIG. 10, the contact rollers 943c can comprise hybrid rollers with a first portion 956 that form contact areas and a second portion 954 that form deformations (e.g., ring rolling, SELFing, embossing). Furthermore, the contact rollers 943c are shown after the draw tape insertion process that also forms a hem skirt (e.g., indicated by the dashed line) by folding over a length of the first and second edges 910, 912. As mentioned above, passing layers of the first film 980 and the second film 982 between the contact rollers 943c creates one or more contact areas in a least one region between flat portions of the films 980, 982 and a hem skirt extending down an inner surface of the films 980, 982, where the one or more contact areas also extend from the hem channel over the hem skirt and toward bottom edges of the films 980, 982. in alternative implementations the contact rollers 943c can be positioned after the folding operation 920 or another position in the process 900a. For example, FIGS. 9 and 10 illustrate the rollers 943a, 943b, and 943c being position after the folding operation 920. In alternative implementations, the rollers 943a, 943b, 943c can be positioned before the folding operation 920. When positioned after the folding operation 920, one or more of the rollers 943a, 943b, 943c can create patterns of contact areas on opposing sides of the bag that are mirror images of each other (as shown and mentioned above in relation to FIGS. 4A-7).

The present disclosure may be embodied in other specific forms without departing from its spirit or essential characteristics. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A multi-film thermoplastic bag comprising: a first multi-film sidewall comprising a first thermoplastic film layer and a second thermoplastic film layer; a second multi-film sidewall comprising a third thermoplastic film layer and a fourth thermoplastic film layer; and a zone of contact areas comprising a first region, second region, and a second third region, wherein: contacts areas in the first region have a first lamination strength; contact areas in the second region have a second lamination strength that is greater than the first lamination strength; contact areas in the third region that have a third lamination strength that is greater than the second lamination strength; and each contact area in the zone of contact areas comprises a flat, in-plane area bonding the first thermoplastic film layer and the second thermoplastic film layer together.

2. The multi-film thermoplastic bag as recited in claim 1, wherein:
the contact areas in the first region bond a first number of films together;
the contact areas in the second region bond a second number of films together; and
the first number of films is greater than the second number of films.

3. The multi-film thermoplastic bag as recited in claim 2, wherein:
the contact areas in the third region bond a third number of films together; and
the third number of films is less than the second number of films.

4. The multi-film thermoplastic bag as recited in claim 3, wherein:
the first number of films comprises four films;
the second number of films comprises three films; and
the third number of films comprises two films.

5. The multi-film thermoplastic bag as recited in claim 1, further comprising:
a hem channel; and
a draw tape positioned within the hem channel.

6. The multi-film thermoplastic bag as recited in claim 5, wherein the multi-film thermoplastic bag is devoid of a unitary hem seal that extends from a first side seal to an opposing second side seal.

7. The multi-film thermoplastic bag as recited in claim 1, wherein the difference between the second lamination strength and the first lamination strength is due to one or more of:
a difference in film material composition between the first region and the second region; or
a difference in film material properties between the first region and the second region.

8. The multi-film thermoplastic bag as recited in claim 7, wherein the difference in the film material properties between the first region and the second region comprises a gloss of one or more of the first thermoplastic film layer or the second thermoplastic film layer being greater in the second region than in the first region.

9. The multi-film thermoplastic bag as recited in claim 7, wherein the difference in the film material properties between the first region and the second region comprises a surface roughness of one or more of the first thermoplastic film layer or the second thermoplastic film layer being greater in the second region than in the first region.

10. A multi-film thermoplastic bag comprising: an outer first thermoplastic bag comprising first and second opposing sidewalls joined together along a first side edge, an opposite second side edge, an open first top edge, and a closed first bottom edge; an inner second thermoplastic bag positioned within the outer first thermoplastic bag, the inner second thermoplastic bag comprising third and fourth opposing sidewalls joined together along a third side edge, an opposite fourth side edge, an open second top edge, and a closed second bottom edge; a hem channel formed from the open first top edge and the open second top edge being folded over; a draw tape positioned within the hem channel; and a zone of contact areas, wherein: contact areas in the zone of contact areas comprise flat, in-plane areas bonding the first sidewall to the third sidewall or the second sidewall to the fourth sidewall; and a lamination strength of a first plurality of contact areas in the zone of contact areas vary from a lamination strength of a second plurality of contact areas in the zone of contact areas and a lamination strength of a third plurality of contact areas in the zone of contact areas vary from the lamination strength of the first plurality of contact areas and the lamination strength of the second plurality of contact areas.

11. The multi-film thermoplastic bag as recited in claim 10, further comprising a hem skirt formed by a folded over portion of the open first top edge of the outer first thermoplastic bag and the open second top edge of the inner second thermoplastic bag extending from the hem channel, wherein the hem skirt extends down an inner surface of the inner second thermoplastic bag, wherein the contact areas also secure the hem skirt to the inner surface of the inner second thermoplastic bag.

12. The multi-film thermoplastic bag as recited in claim 11, wherein:

the lamination strength of the first plurality of contact areas is less than the lamination strength of the second plurality of contact areas; and the second plurality of contact areas bond an end of the hem skirt to the inner surface of the inner second thermoplastic bag.

13. The multi-film thermoplastic bag as recited in claim 10, wherein the lamination strength of the first plurality of contact areas vary from the lamination strength of the second plurality of contact areas along a transverse direction.

14. The multi-film thermoplastic bag as recited in claim 10, wherein the lamination strength of the first plurality of contact areas vary from the lamination strength of the second plurality of contact areas along a machine direction.

15. The multi-film thermoplastic bag as recited in claim 10, wherein the lamination strength of the first plurality of contact areas vary from the lamination strength of the second plurality of contact areas due to a difference in pattern density between the first plurality of contact areas and the second plurality of contact areas.

16. The multi-film thermoplastic bag as recited in claim 10, wherein the contact areas in the zone of contact areas form a uniform, repeating pattern.

17. The multi-film thermoplastic bag as recited in claim 10, wherein the lamination strength of the second plurality of contact areas is 2 to 4 times the lamination strength of the first plurality of contact areas.

18. The multi-film thermoplastic bag as recited in claim 17, wherein the lamination strength of the second plurality of contact areas is greater than a weakest tear resistance of the outer first thermoplastic bag and the inner second thermoplastic bag.

19. The multi-film thermoplastic bag as recited in claim 18, wherein the lamination strength of the first plurality of contact areas is lesser than the weakest tear resistance of the outer first thermoplastic bag and the inner second thermoplastic bag.

* * * * *